(12) United States Patent
Tatsumi et al.

(10) Patent No.: US 11,086,562 B2
(45) Date of Patent: Aug. 10, 2021

(54) COMPUTER SYSTEM HAVING DATA AMOUNT REDUCTION FUNCTION AND STORAGE CONTROL METHOD

(71) Applicant: Hitachi, Ltd., Tokyo (JP)

(72) Inventors: Ryosuke Tatsumi, Tokyo (JP); Tomohiro Yoshihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 16/086,292

(22) PCT Filed: Sep. 13, 2016

(86) PCT No.: PCT/JP2016/076904
§ 371 (c)(1),
(2) Date: Sep. 18, 2018

(87) PCT Pub. No.: WO2018/051392
PCT Pub. Date: Mar. 22, 2018

(65) Prior Publication Data
US 2019/0095132 A1    Mar. 28, 2019

(51) Int. Cl.
*G06F 3/06* (2006.01)
*G06F 12/02* (2006.01)

(52) U.S. Cl.
CPC .......... *G06F 3/0658* (2013.01); *G06F 3/0608* (2013.01); *G06F 3/0631* (2013.01); *G06F 3/0641* (2013.01); *G06F 3/0673* (2013.01); *G06F 12/0284* (2013.01)

(58) Field of Classification Search
CPC .... G06F 3/0658; G06F 3/0608; G06F 3/0631; G06F 3/0641; G06F 3/0673; G06F 12/0284
See application file for complete search history.

(56) References Cited

U.S. PATENT DOCUMENTS

| | | | | |
|---|---|---|---|---|
| 6,128,630 | A * | 10/2000 | Shackelford | G06F 16/2358 |
| 8,527,544 | B1 * | 9/2013 | Colgrove | G06F 3/0608 |
| | | | | 707/791 |
| 9,710,165 | B1 * | 7/2017 | Lherault | G06F 3/0665 |
| 9,733,836 | B1 * | 8/2017 | Garg | G06F 3/0631 |
| 10,496,626 | B2 * | 12/2019 | Friedman | G06F 3/0641 |

(Continued)

*Primary Examiner* — Ramon A. Mercado
(74) *Attorney, Agent, or Firm* — Procopio, Cory, Hargreaves & Savitch LLP

(57) ABSTRACT

In a case where updated data using a first logical address as a write destination and existing data using a second logical address as a write destination duplicate with each other, a computer system writes predetermined data instead of updated data to a memory segment associated with a first physical address, and dynamically maps the first logical address to a second physical address. The computer system transmits a write command of the predetermined data or an unmapping command that designates a virtual address that complies with the first physical address, to a storage device that corresponds to the first physical address. The first and second logical addresses are logical addresses that belong to a logical address range which is at least a part of a logical address space. The first physical address is a physical address that belongs to a physical address range which is at least a part of a physical address space, and is a physical address statically mapped to the first logical address.

14 Claims, 25 Drawing Sheets

(56) References Cited

U.S. PATENT DOCUMENTS

| | | | |
|---|---|---|---|
| 2009/0083610 A1* | 3/2009 | Arai | G06F 3/0608 |
| | | | 714/807 |
| 2012/0317084 A1* | 12/2012 | Liu | G06F 3/0641 |
| | | | 707/692 |
| 2015/0253999 A1* | 9/2015 | Nemazie | G06F 3/0608 |
| | | | 711/103 |
| 2016/0179395 A1* | 6/2016 | Fisher | G06F 3/0688 |
| | | | 711/103 |
| 2016/0350175 A1* | 12/2016 | Nazari | G06F 3/0619 |
| 2019/0095132 A1* | 3/2019 | Tatsumi | G06F 3/0608 |

* cited by examiner

[FIG. 1]
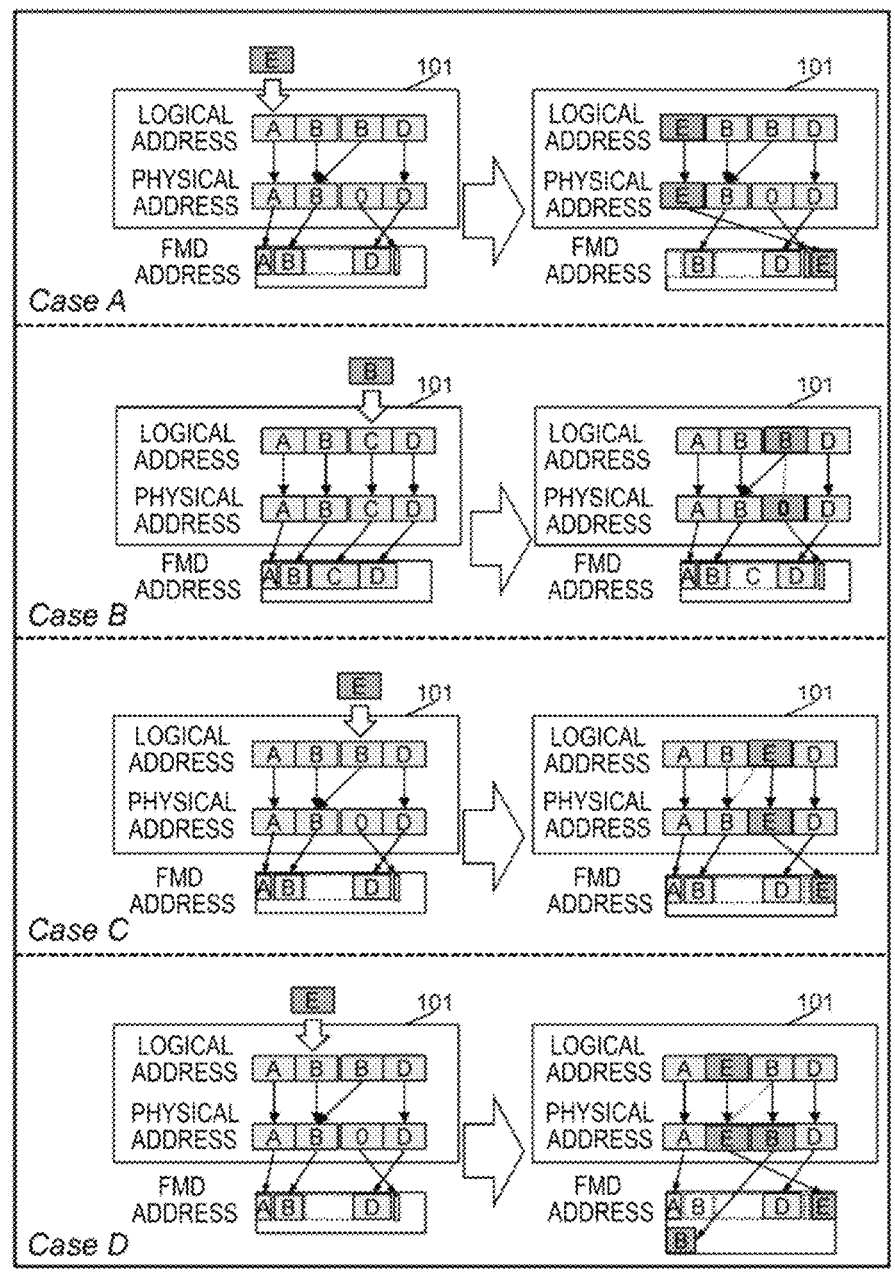

[FIG. 2]
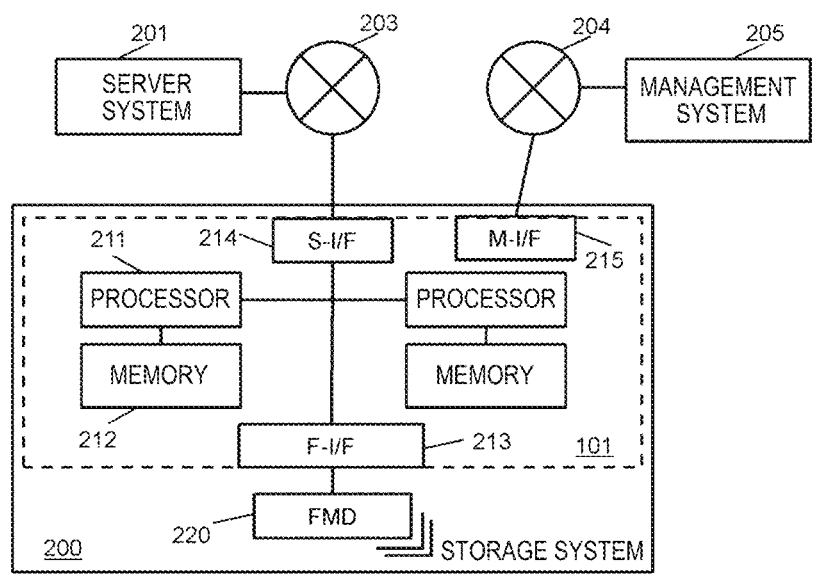
[FIG. 3]
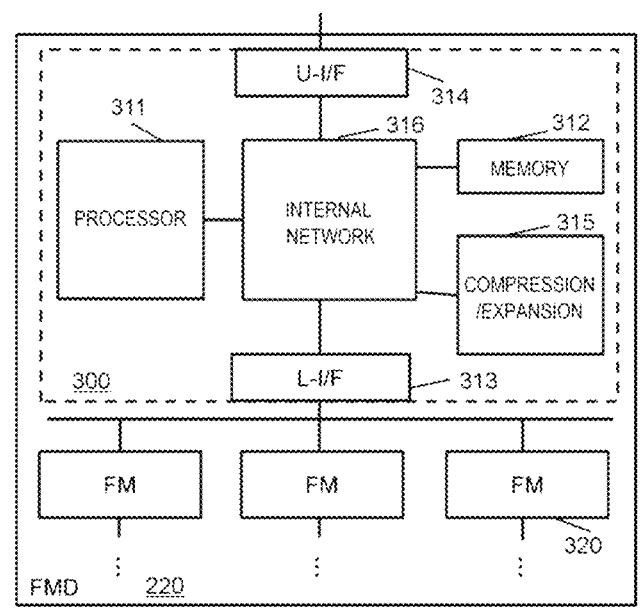

[FIG. 4]
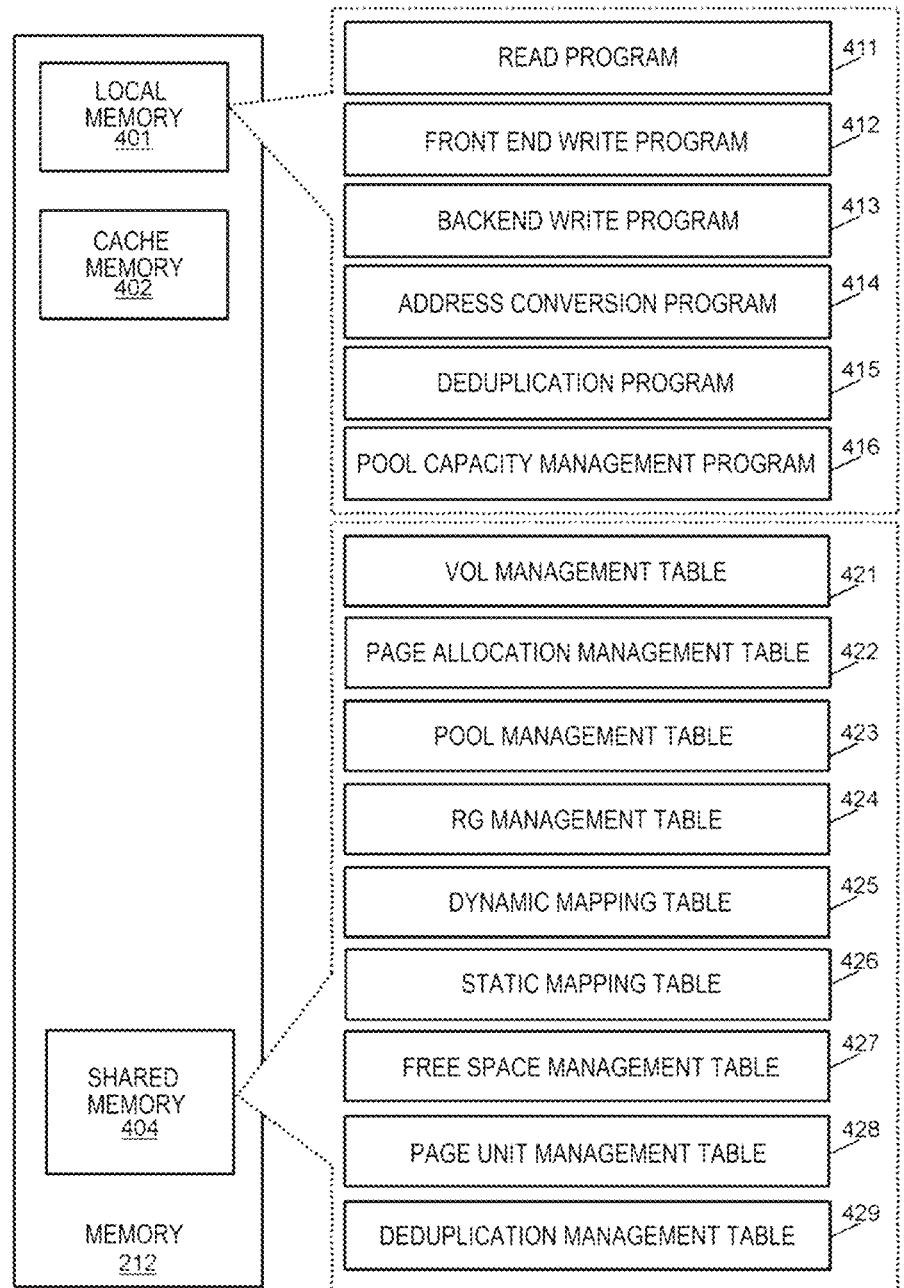

[FIG. 5]
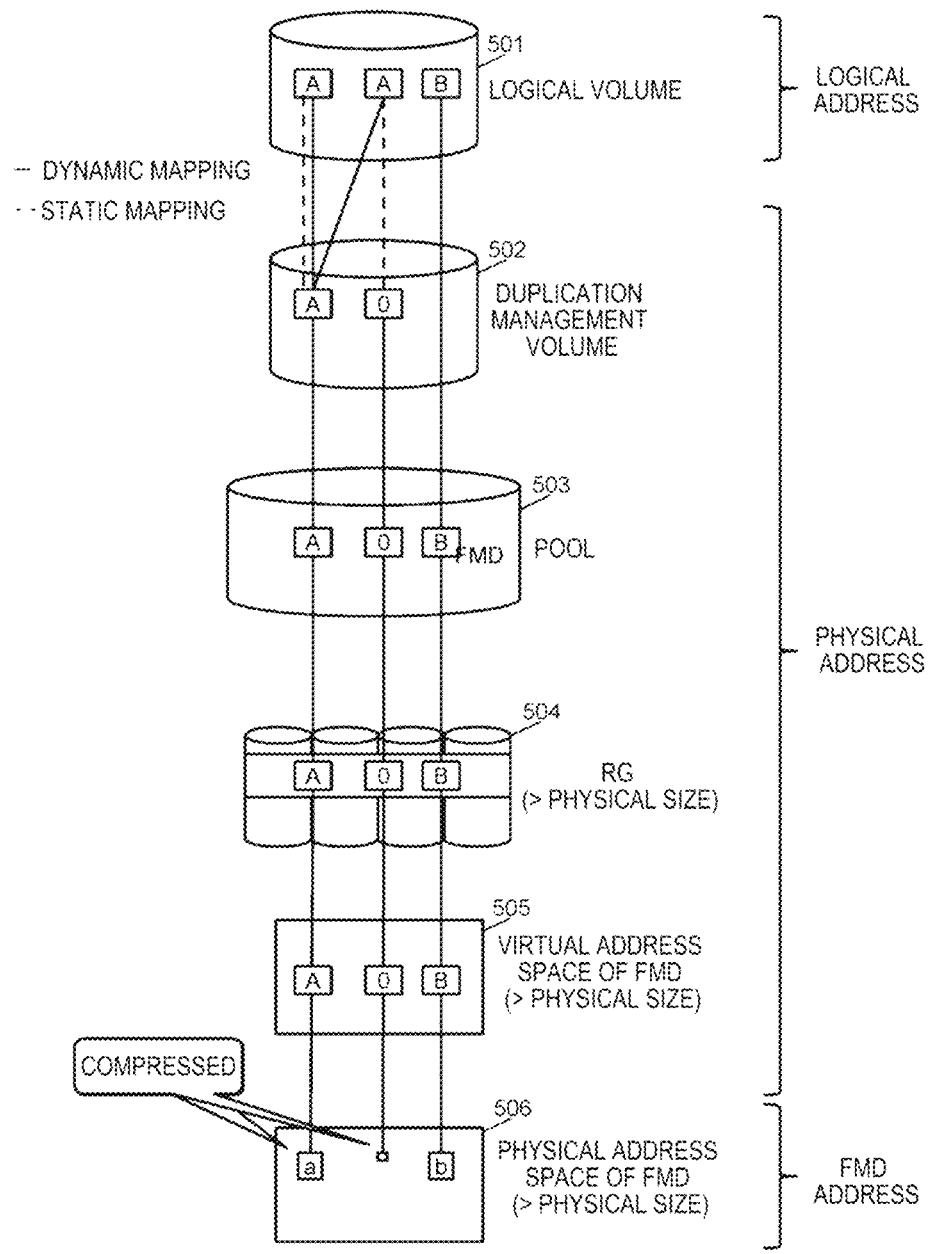

[FIG. 6]
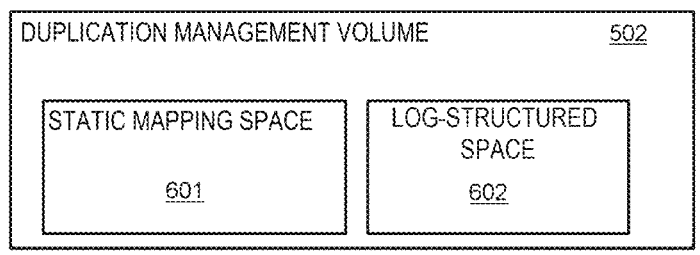
[FIG. 7]
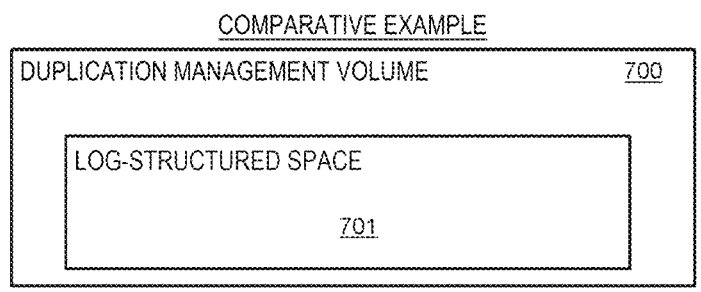
[FIG. 8]
VOL MANAGEMENT TABLE
421
| VOL# | VOL ATTRIBUTE | VOL CAPACITY | POOL # |
|---|---|---|---|
| 0 | THIN PROVISIONING (LOGIC) | 200GB | 0 |
| 10 | DUPLICATION MANAGEMENT | 400GB | 0 |
| 20 | NORMAL VOL (LOGIC) | 10GB | NONE |
| ... | ... | ... | ... |

[FIG. 9]

PAGE ALLOCATION MANAGEMENT TABLE
422

| VOL# | VOL ADDRESS | PAGE # | PAGE ALLOCATION STATE |
|---|---|---|---|
| 0 | 0 | 0 | ALLOCATED |
| 1 | 100 | - | DUPLICATION MANAGEMENT STATE |
| 100 | 20000 | 2 | ALLOCATED |
| 100 | 40000 | - | UNALLOCATED |
| ... | ... | ... | ... |

POOL MANAGEMENT TABLE
423

| POOL # | RG# | VIRTUAL POOL CAPACITY | VIRTUAL POOL USAGE CAPACITY | ACTUAL POOL CAPACITY | ACTUAL POOL USAGE CAPACITY | PRESENCE OR ABSENCE OF CAPACITY VIRTUALIZATION FUNCTION |
|---|---|---|---|---|---|---|
| 0 | 0, 1 | 200TB | 100TB | 50TB | 10TB | PRESENT |
| 1 | 2, 3 | 100TB | 80TB | 20TB | 5TB | PRESENT |
| 2 | 4 | 50TB | 10TB | - | - | ABSENT |
| ... | ... | ... | ... | ... | ... | ... |

RAID GROUP MANAGEMENT TABLE
424

| RG# | FMD# | RAID LEVEL | VIRTUAL RG CAPACITY | ACTUAL RG CAPACITY | ACTUAL RG USAGE CAPACITY | PRESENCE OR ABSENCE OF CAPACITY VIRTUALIZATION FUNCTION |
|---|---|---|---|---|---|---|
| 0 | 0<br>1<br>2<br>3<br>4<br>5<br>6 | RAID5 | 100TB | 25TB | 6TB | PRESENT |
| 1 | 7<br>8<br>9<br>10<br>11<br>12<br>13<br>14 | RAID5 | 100TB | 25TB | 4TB | PRESENT |
| 2 | 7<br>8<br>9<br>10<br>11<br>12<br>13<br>14 | RAID5 | 60TB | 10TB | 3TB | PRESENT |
| 3 | 7<br>8<br>9<br>10<br>11<br>12<br>13<br>14 | RAID6 | 40TB | - | - | ABSENT |
| ... | ... | ... | ... | ... | ... | ... |

DYNAMIC MAPPING TABLE
425

| VOL# | VOL ADDRESS | DUPLICATION MANAGEMENT VOLUME # | DUPLICATION MANAGEMENT ADDRESS | DEDUPLICATION STATE |
|---|---|---|---|---|
| 0 | 0 | 100 | 0 | NO DUPLICATION |
| 0 | 100 | 101 | 100 | WITH DUPLICATION (DUPLICATION SOURCE) |
| 0 | 200 | 101 | 100 | WITH DUPLICATION (DUPLICATION DESTINATION) |
| ... | ... | ... | ... | ... |

Columns: 1201, 1202, 1203, 1204, 1205

[FIG. 13]

STATIC MAPPING TABLE
426

| VOL# | VOL ADDRESS | DUPLICATION MANAGEMENT VOLUME # | DUPLICATION MANAGEMENT ADDRESS |
|---|---|---|---|
| 0 | 0 | 100 | 0 |
| 1 | 0 | 101 | 0 |
| 2 | 0 | 102 | 0 |
| ... | ... | ... | ... |

Columns: 1301, 1302, 1303, 1304

[FIG. 14]

FREE SPACE MANAGEMENT TABLE
427

| DUPLICATION MANAGEMENT VOLUME # | HEAD ADDRESS | END ADDRESS | USED ADDRESS | RELEASED ADDRESS |
|---|---|---|---|---|
| 100 | 500000 | 600000 | 550000 | 520000 |
| 101 | 250000 | 300000 | 290000 | 260000 |
| 102 | 280000 | 300000 | 285000 | 290000 |
| ... | ... | ... | ... | ... |

[FIG. 15]

PAGE UNIT MANAGEMENT TABLE
428

| PAGE # | VOL # | VOL ADDRESS | VIRTUAL RG # | VIRTUAL RG ADDRESS | PRESENCE OR ABSENCE OF DEDUPLICATION | ALLOCATION DESTINATION ATTRIBUTE |
|---|---|---|---|---|---|---|
| 0 | 0 | 10000 | 4 | 500 | - | LOGICAL VOLUME |
| 1 | 100 | 20000 | 0 | 200 | ABSENT | DUPLICATION MANAGEMENT VOLUME |
| 2 | 100 | 25000 | 1 | 100 | - | LOGICAL VOLUME |
| 3 | 101 | 11000 | 2 | 30 | PRESENT | DUPLICATION MANAGEMENT VOLUME |
| ... | ... | ... | ... | ... | ... | ... |

[FIG. 16]
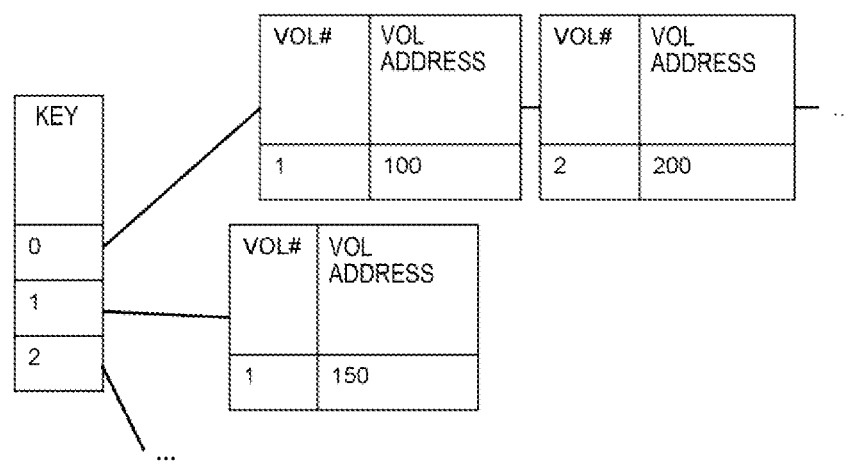
[FIG. 17]
POOL LIST 1700
| POOL # | REDUCTION RATE | LOGICAL CAPACITY | | ACTUAL CAPACITY | |
|---|---|---|---|---|---|
| | | LOGICAL CAPACITY | LOGICAL USAGE CAPACITY | ACTUAL CAPACITY | ACTUAL USAGE CAPACITY |
| 1 | 10% | 200TB | 100TB | 50TB | 10TB |
| 2 | 6% | 100TB | 80TB | 20TB | 5TB |
| ... | ... | ... | ... | ... | ... |

[FIG. 18]
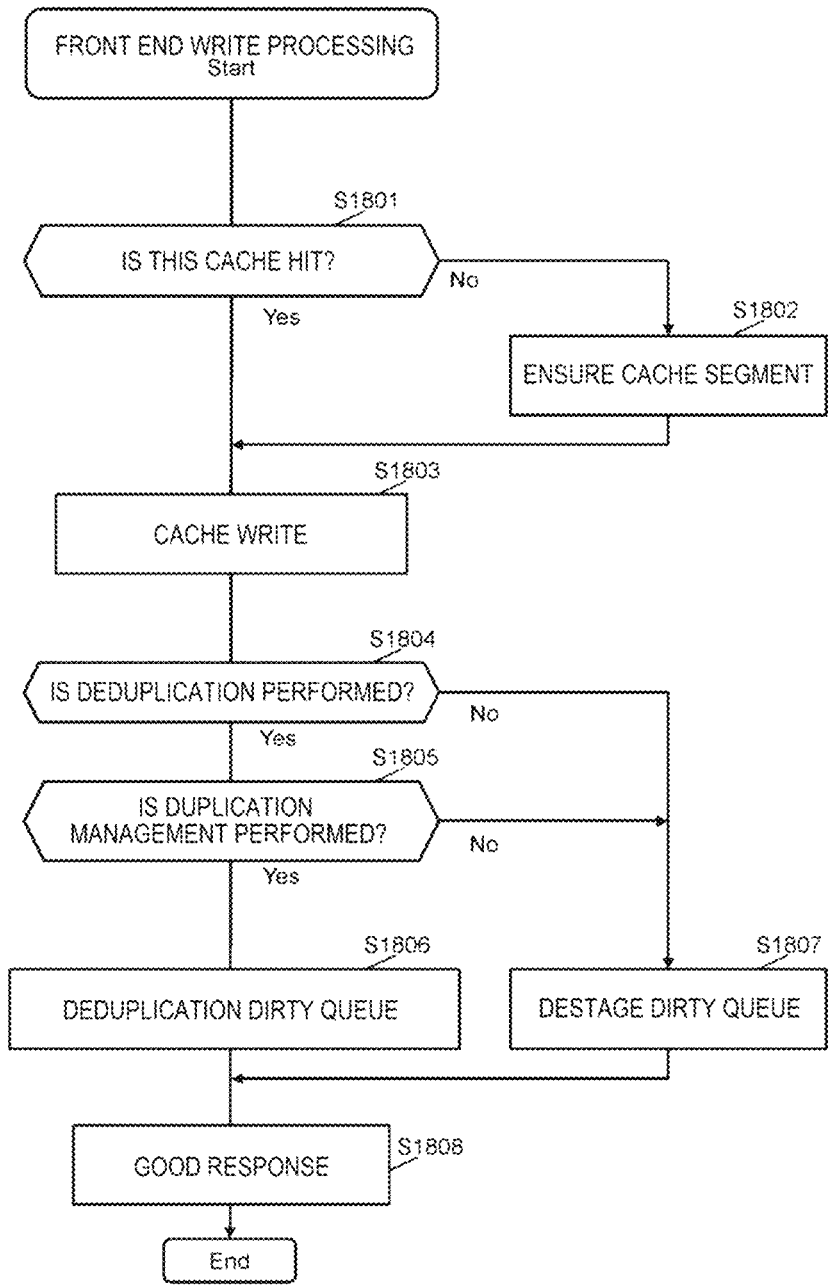

[FIG. 19]
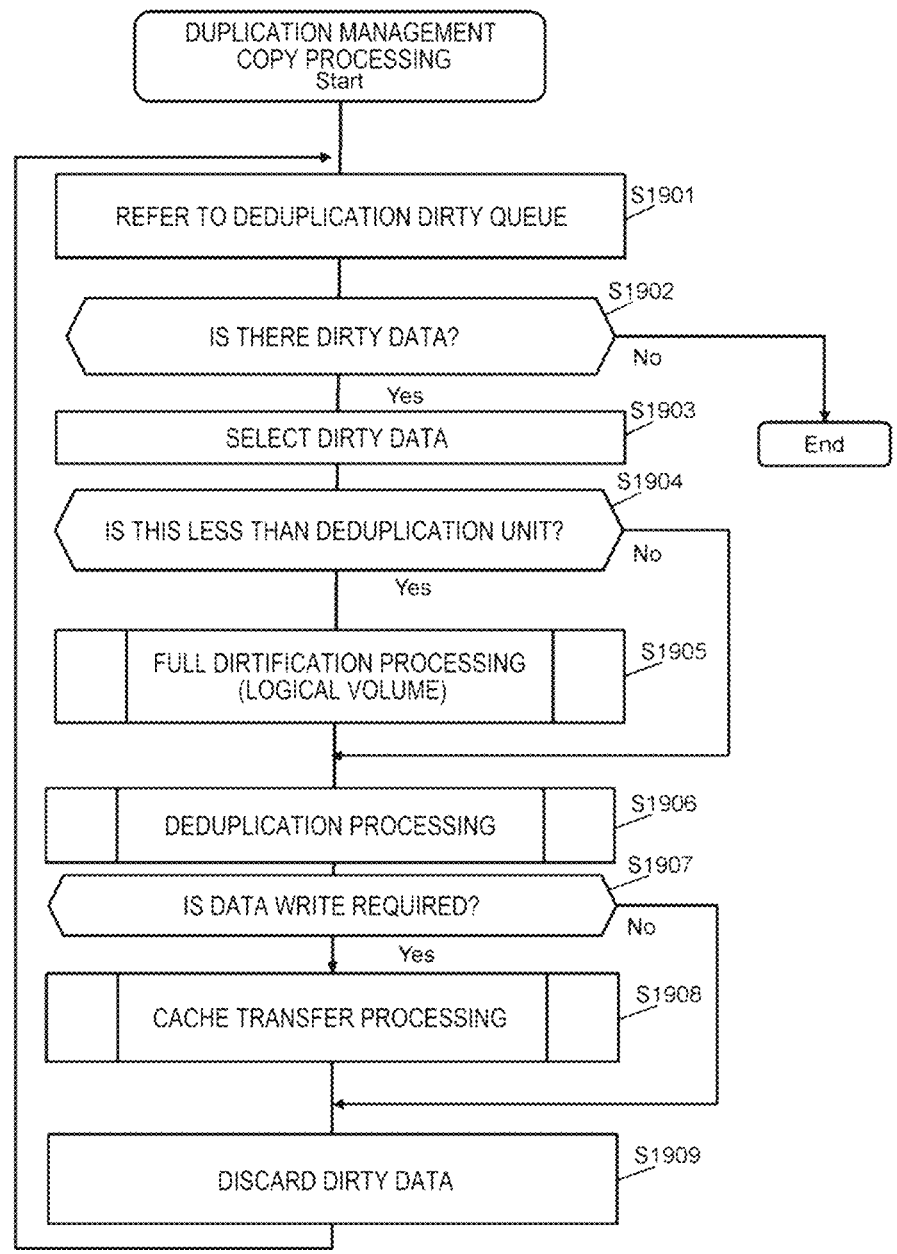

[FIG. 20]
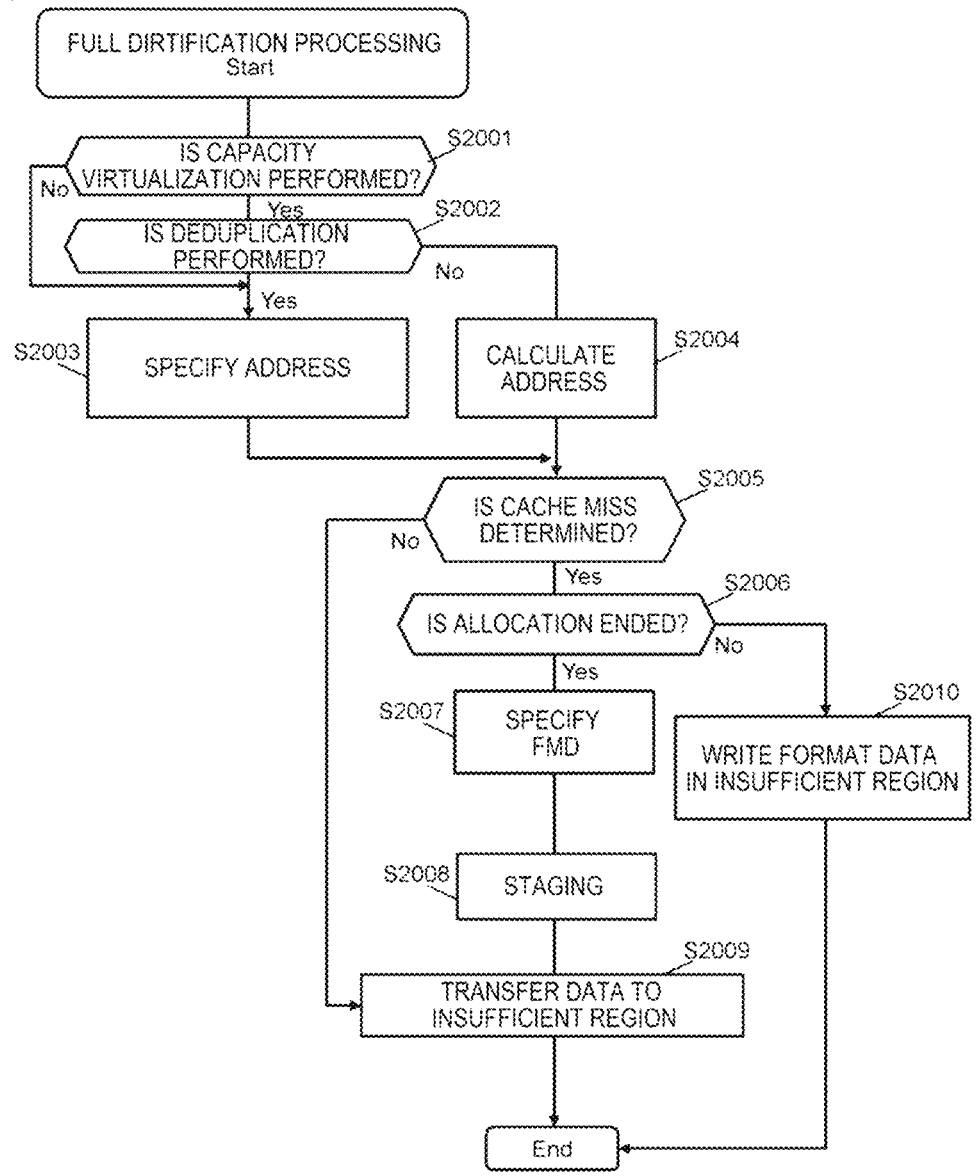

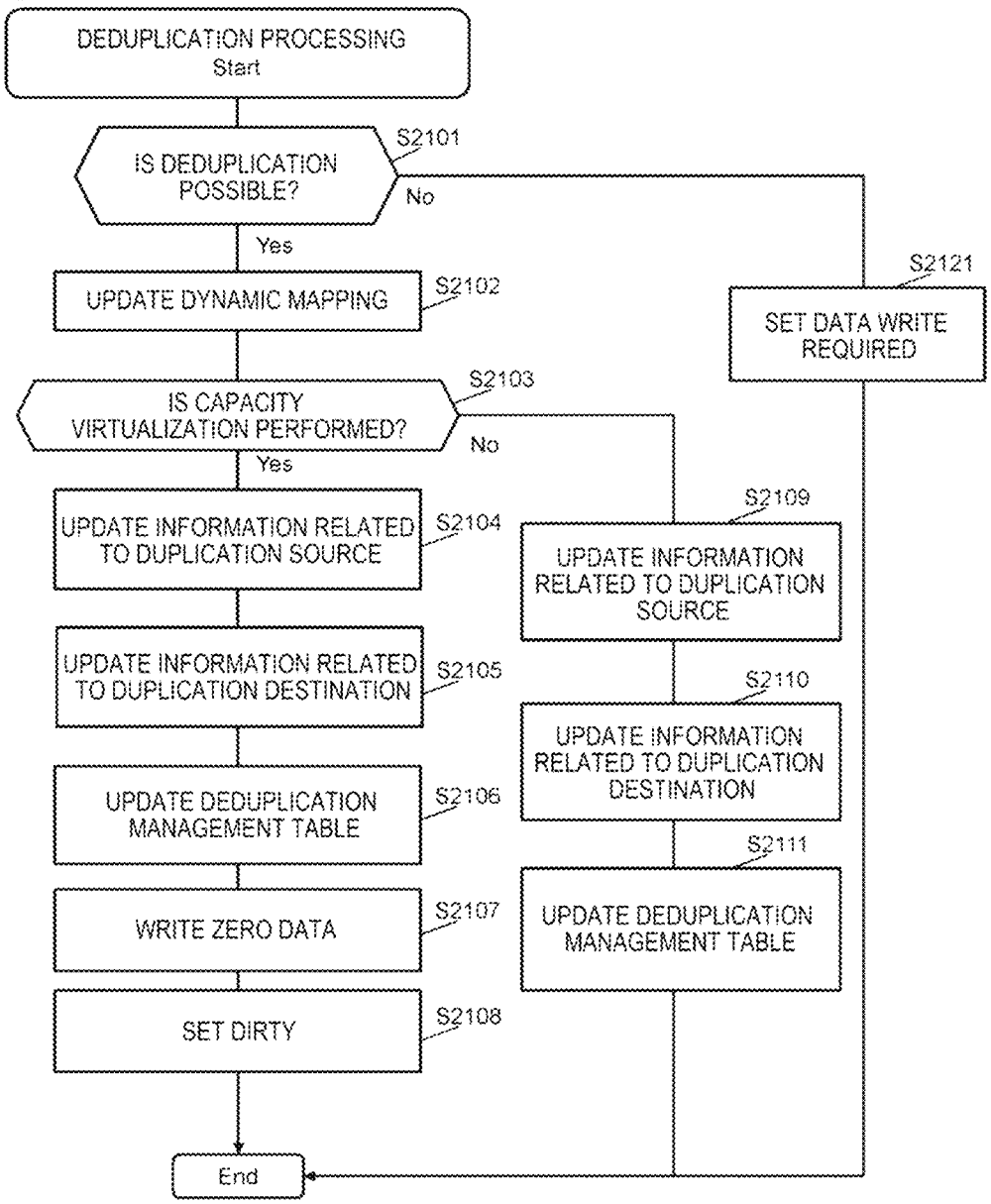
[FIG. 21]

[FIG. 22]
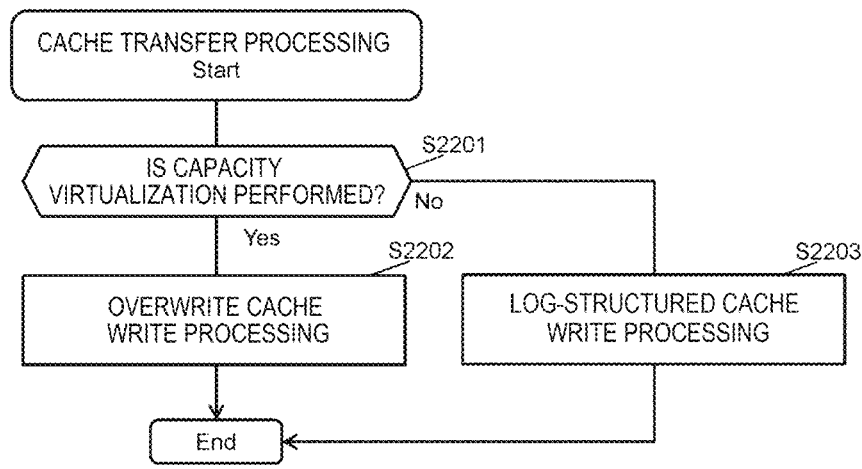
[FIG. 23]
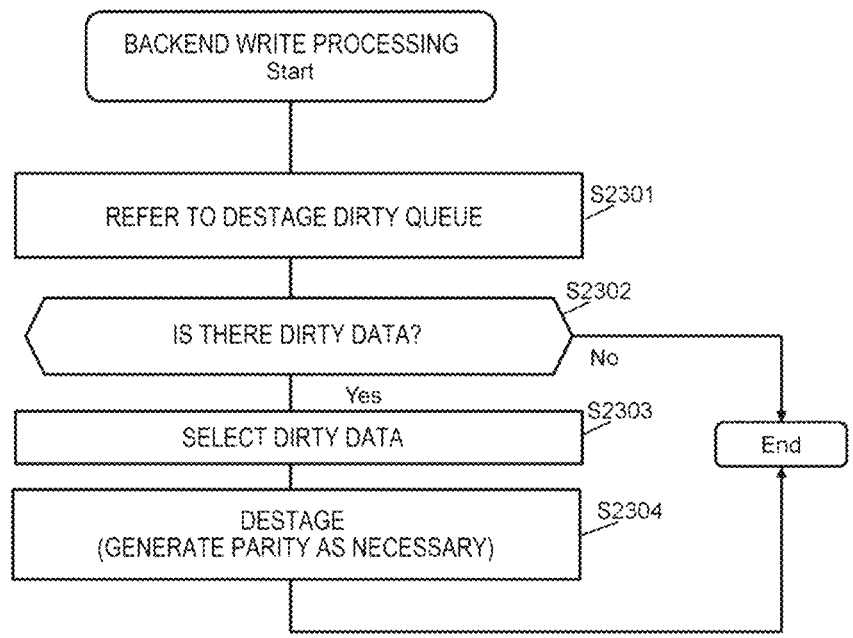

[FIG. 24]
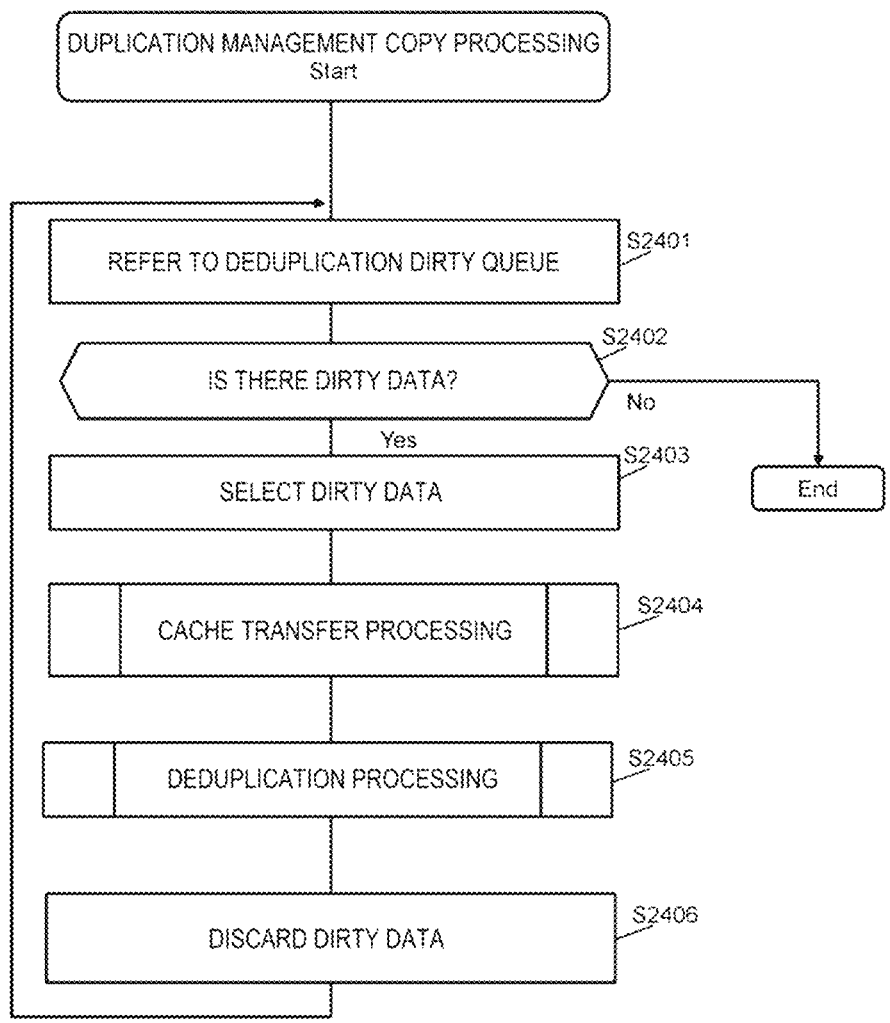

[FIG. 25]
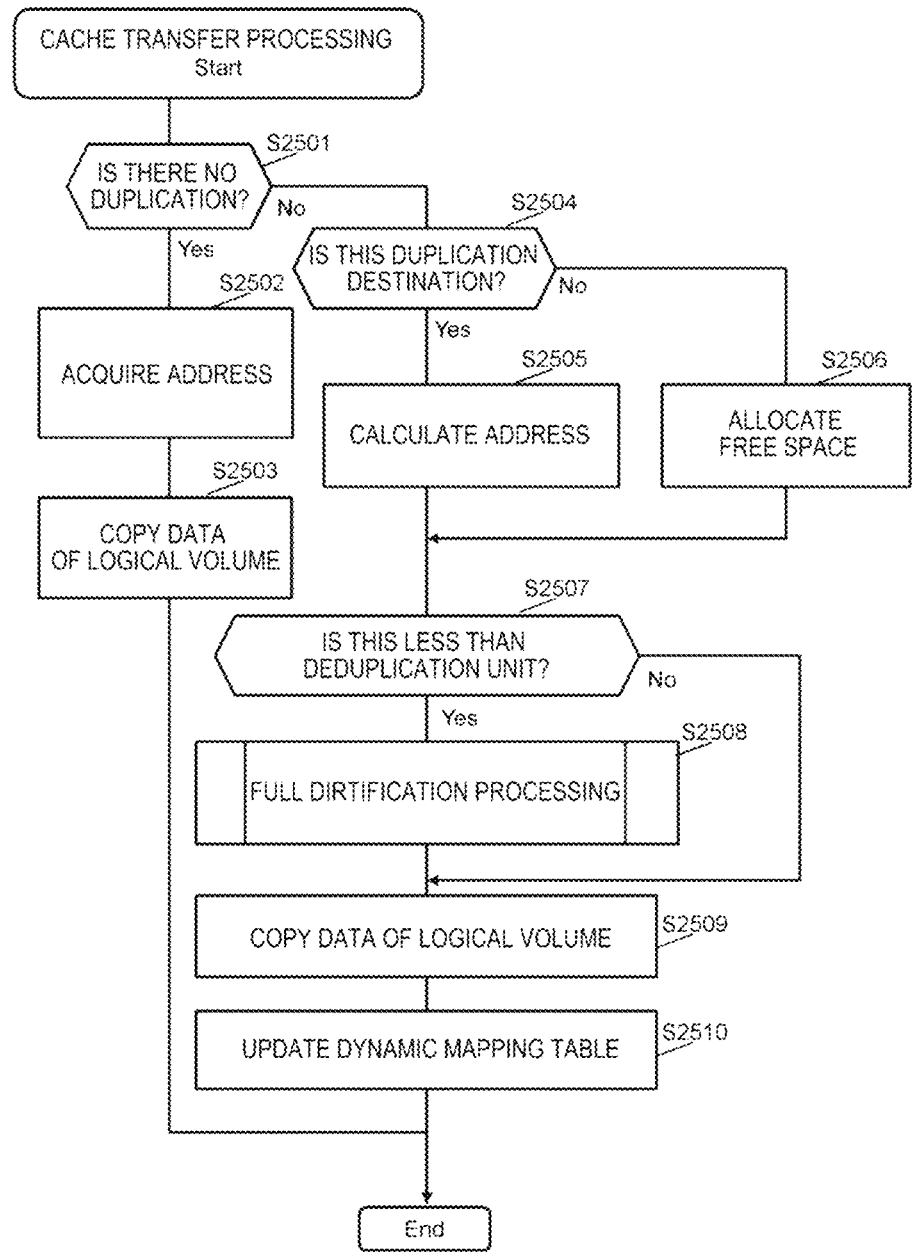

[FIG. 26]
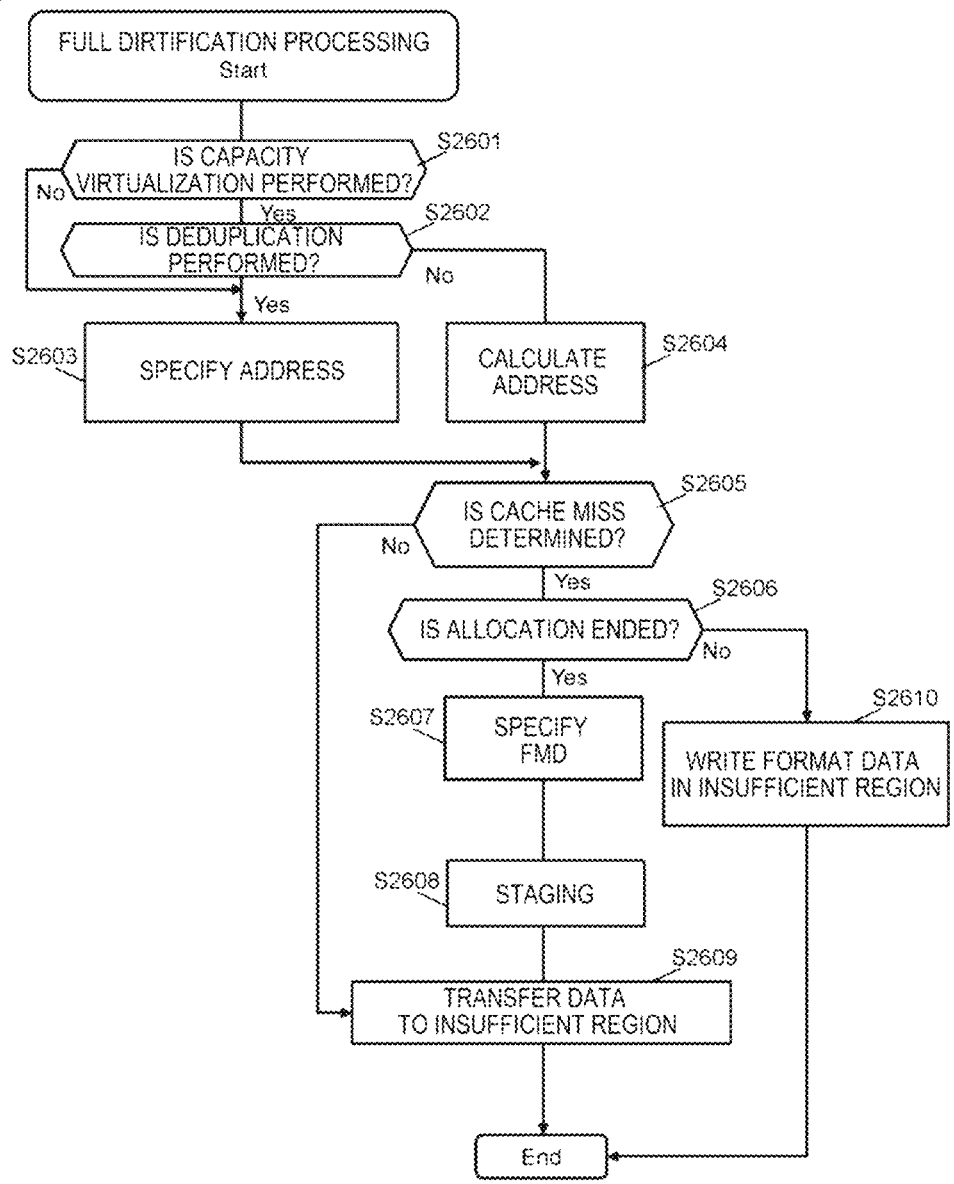

[FIG. 27]
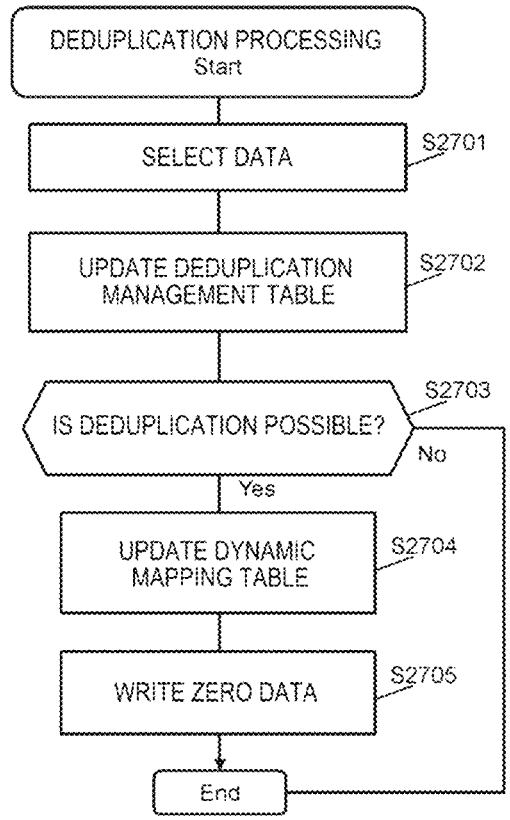
[FIG. 28]
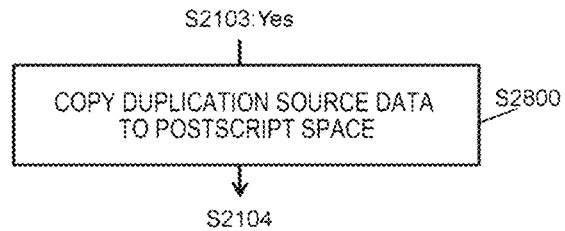

[FIG. 29]
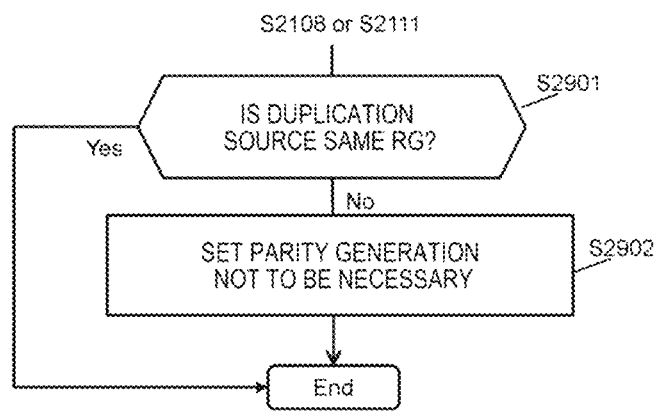
[FIG. 30]
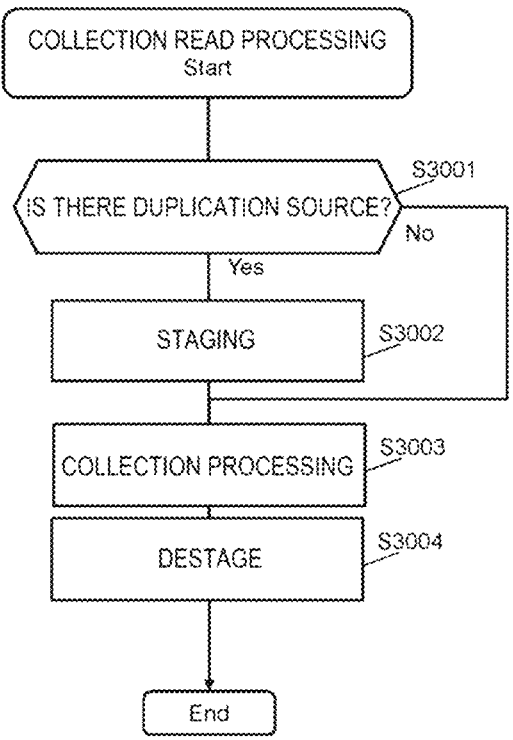

[FIG. 31]
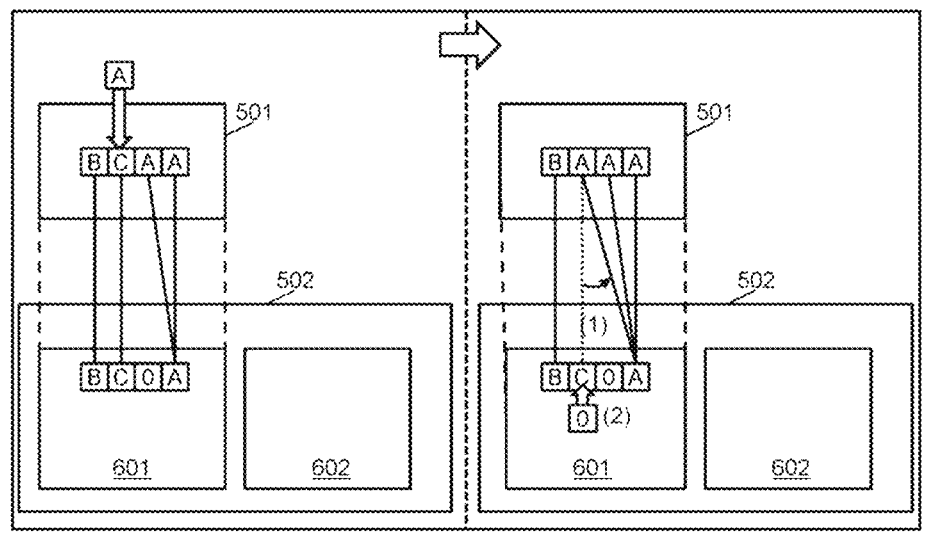
[FIG. 32]
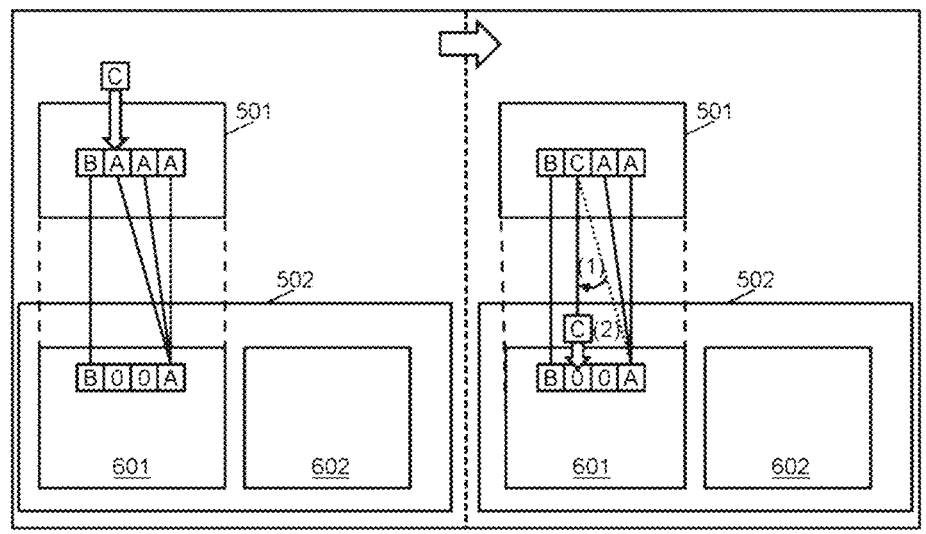

[FIG. 33]
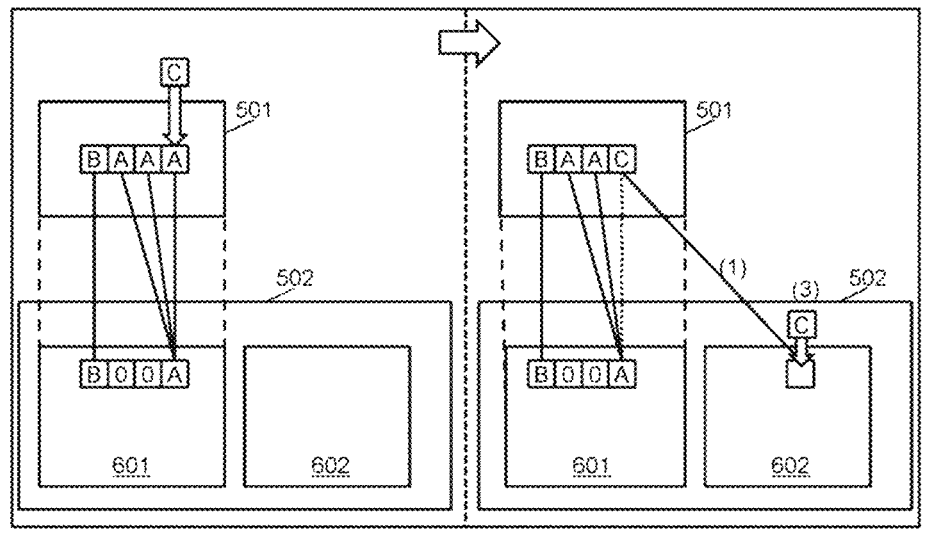
[FIG. 34]
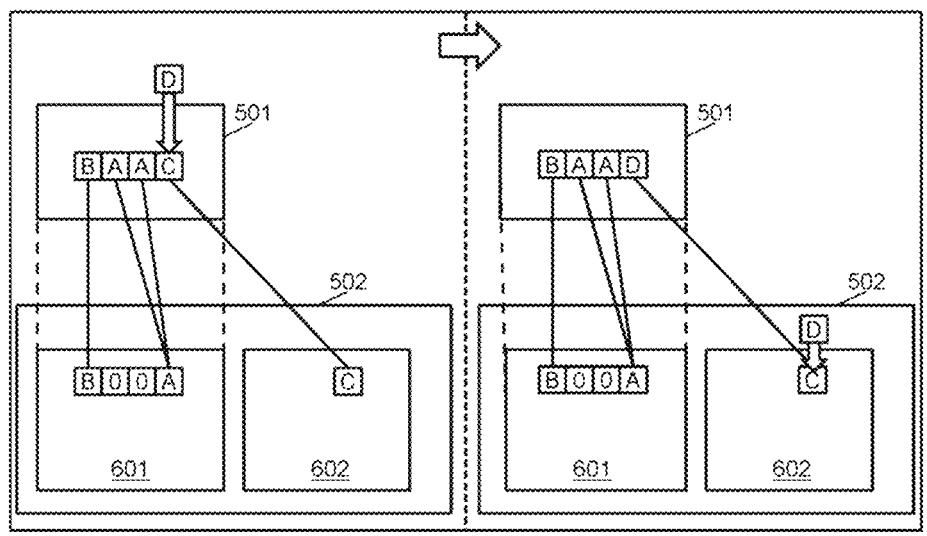

[FIG. 35]
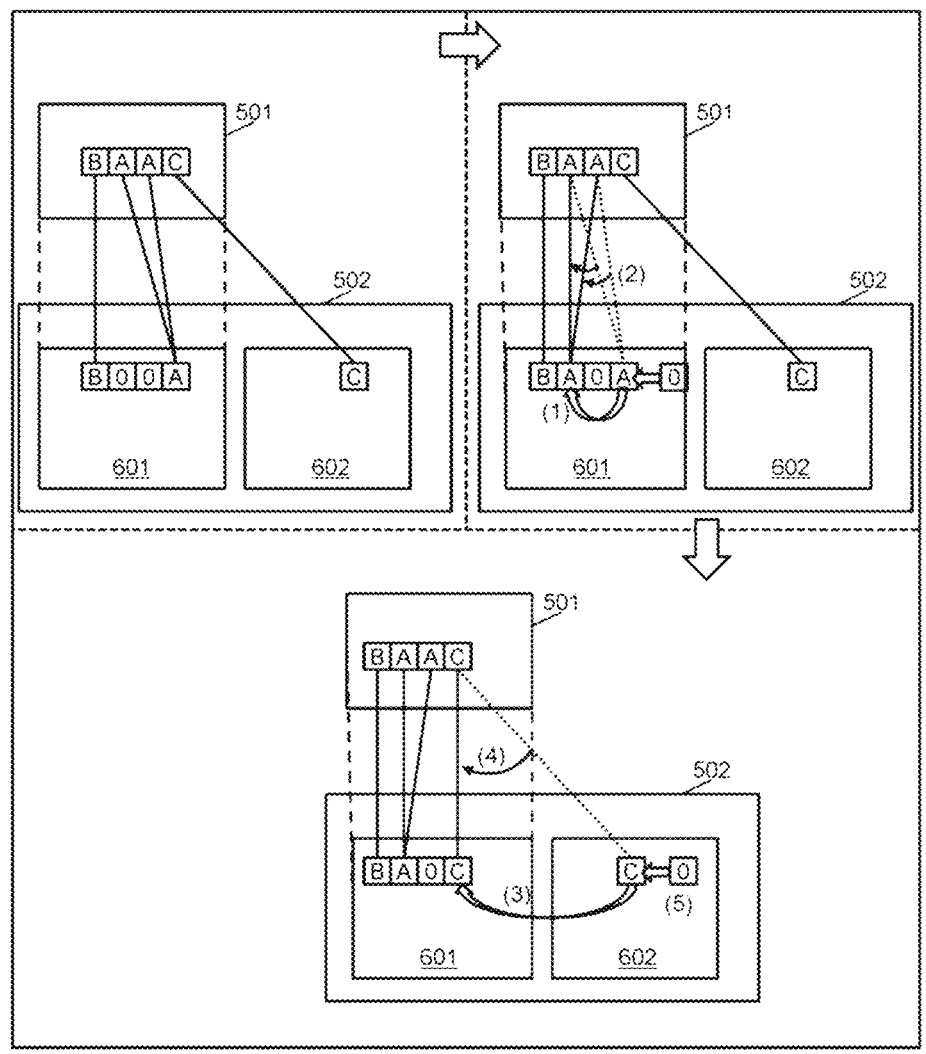

[FIG. 36]
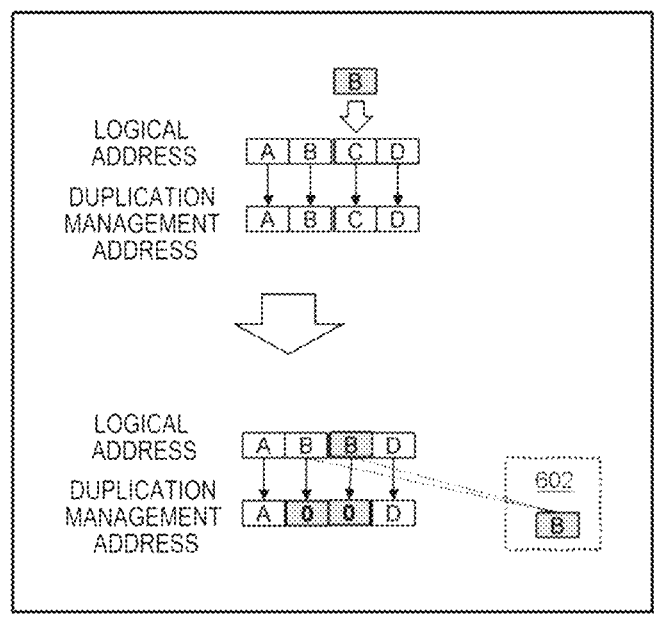

[FIG. 37]
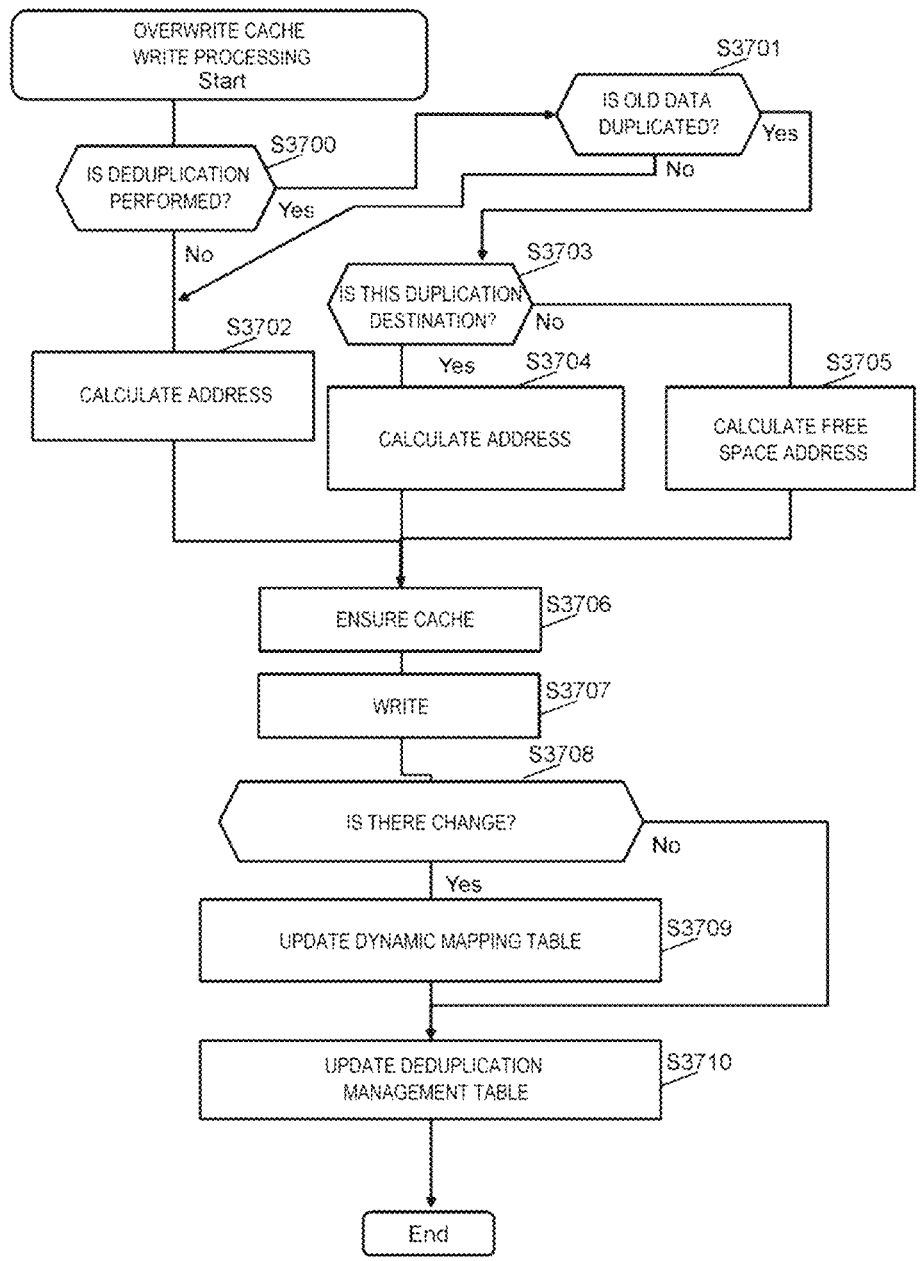

COMPUTER SYSTEM HAVING DATA AMOUNT REDUCTION FUNCTION AND STORAGE CONTROL METHOD

TECHNICAL FIELD

The present invention generally relates to storage control in a computer system having a data amount reduction function.

BACKGROUND ART

An example of a computer system is a storage system. As a storage system having a data amount reduction function, for example, a storage system disclosed in PTL 1, that is, a storage system having a garbage collection function is known. PTL 1 discloses the following.

The storage system includes a storage device and a storage controller having a garbage collection function. The storage controller manages mapping between a virtual address and a physical address of the storage device. In a case where writing to the virtual address occurs, the storage controller performs mapping update (update of the address conversion table) which means mapping a free physical address of a new write destination instead of the already allocated physical address with respect to the virtual address. As a result, invalid data (data that complies with the physical address which the mapping to the virtual address is canceled) increases. The storage controller executes garbage collection of copying valid data (data that complies with the physical address mapped to any virtual address) and deleting the invalid data. Accordingly, a data amount is reduced and the free physical address (free regions) increases.

CITATION LIST

Patent Literature

PTL 1: U.S. Pat. No. 8,527,544

SUMMARY OF INVENTION

Technical Problem

According to the storage system according to PTL 1, a processing load of a storage controller increases in order to realize reduction of a data amount. Specifically, the storage controller needs to perform mapping update (update of an address conversion table) every time writing occurs to a virtual address. In addition, a case can occur where the storage controller must copy a large amount of valid data for garbage collection.

When the processing load of the storage controller increases, I/O (input/output) performance of data may deteriorate.

There can also be a similar problem in a case where a server system having a data amount reduction function (for example, a server including an auxiliary storage device, such as a hard disk drive (HDD)) is adopted as an example of a computer system.

Solution to Problem

In a case where updated data using a first logical address as a write destination and existing data using a second logical address as a write destination duplicate with each other, a computer system writes predetermined data instead of updated data in a memory segment associated with a first physical address, and dynamically maps the first logical address to a second physical address. The computer system transmits a write command of the predetermined data or an unmapping command that designates a virtual address that complies with the first physical address, to a storage device that corresponds to the first physical address. The first and second logical addresses are logical addresses that belong to a logical address range which is at least a part of a logical address space. The first physical address is a physical address that belongs to a physical address range which is at least apart of a physical address space, and is a physical address statically mapped to the first logical address.

Advantageous Effects of Invention

It is possible to realize data amount reduction while restraining a processing load of a processor unit.

BRIEF DESCRIPTION OF DRAWINGS

FIG. 1 illustrates an outline of Embodiment 1.

FIG. 2 illustrates a configuration of a storage system.

FIG. 3 illustrates a configuration of a flash memory device (FMD).

FIG. 4 illustrates a configuration of a memory in a storage controller, and programs and information in the memory.

FIG. 5 illustrates a storage hierarchy in the storage system.

FIG. 6 illustrates a configuration of a duplication management volume.

FIG. 7 illustrates a configuration of a duplication management volume according to one comparative example.

FIG. 8 illustrates a configuration of a VOL management table.

FIG. 9 illustrates a configuration of a page allocation management table.

FIG. 10 illustrates a configuration of a pool management table.

FIG. 11 illustrates a configuration of an RG management table.

FIG. 12 illustrates a configuration of a dynamic mapping table.

FIG. 13 illustrates a configuration of a static mapping table.

FIG. 14 illustrates a configuration of a free space management table.

FIG. 15 illustrates a configuration of a page unit management table.

FIG. 16 illustrates a configuration of the page unit management table.

FIG. 17 illustrates a pool list screen.

FIG. 18 illustrates a flow of front end write processing.

FIG. 19 illustrates a flow of duplication management processing according to Embodiment 1.

FIG. 20 illustrates a flow of full dirtification processing according to Embodiment 1.

FIG. 21 illustrates a flow of deduplication processing according to Embodiment 1.

FIG. 22 illustrates a flow of cache transfer processing according to Embodiment 1.

FIG. 23 illustrates a flow of backend write processing.

FIG. 24 illustrates a flow of duplication management processing according to Embodiment 2.

FIG. 25 illustrates a flow of cache transfer processing according to Embodiment 2.

FIG. 26 illustrates a flow of full dirtification processing according to Embodiment 2.

FIG. 27 illustrates a flow of deduplication processing according to Embodiment 2.

FIG. 28 illustrates a part of a flow of deduplication processing according to Embodiment 3.

FIG. 29 illustrates a part of a flow of deduplication processing according to Embodiment 4.

FIG. 30 illustrates a flow of collection read processing.

FIG. 31 is a schematic view of an example of a case where updated data duplicates existing data in a logical volume.

FIG. 32 is a schematic view of an example of a case where a write destination of non-duplicated updated data is a duplication destination logical address.

FIG. 33 is a schematic view of an example of a case where a write destination of non-duplicated updated data is a duplication source logical address.

FIG. 34 is a schematic view of an example of a case where the updated data does not duplicate with any existing data in the logical volume.

FIG. 35 is a schematic view of an example of duplication withdrawal processing.

FIG. 36 is a schematic diagram of an example of deduplication according to Embodiment 3.

FIG. 37 illustrates a flow of overwrite cache write processing.

DESCRIPTION OF EMBODIMENTS

Hereinafter, several examples will be described with reference to the drawings.

In the following description, "interface unit" is one or more interfaces. The one or more interfaces may be one or more of the same type of interface devices (for example, one or more network interface cards (NIC)) or may be two or more of different types of interface devices (for example, NIC and host bus adapter (HBA)). Further, in the following description, the interface device may be abbreviated as "I/F".

In addition, in the following description, "PDEV" means a physical storage device, and typically, may be a nonvolatile storage device (for example, an auxiliary storage device). The PDEV may be, for example, a nonvolatile memory device including a nonvolatile memory. As such a nonvolatile memory device, an FM device (hereinafter, referred to as FMD) including a flash memory (FM) will be taken as an example, but instead of the FMD, a nonvolatile memory device including another type of nonvolatile memory (for example, a semiconductor memory, such as, a magnetoresistive random access memory (MRAM) which is a magnetoresistive memory, a resistance random access memory (ReRAM) which is a resistance change type memory, or a ferroelectric random access memory (FeRAM) which is a ferroelectric memory).

In addition, in the following description, "memory unit" is one or more memories. At least one memory may be a volatile memory or may be a nonvolatile memory.

In addition, in the following description, "processor unit" is one or more processors. At least one processor is typically a central processing unit (CPU). The processor may include a hardware circuit which performs some or all of the processing.

In addition, in the following description, there is a case where the processing is described using "program" as the subject, but in order to appropriately perform the program by the processor unit, the determined processing is performed while including at least one among a storage unit and the interface unit, the subject of the processing may be a processor unit (or a computer or a computer system including the processor unit). The program may be installed in the computer from a program source. The program source may be, for example, a program distribution server or a storage medium readable by the computer. In addition, in the following description, two or more programs may be realized as one program, or one program may be realized as two or more programs.

In addition, in the following description, information may be described by the expression of "xxx table", but the information may be expressed by any data structure. In other words, since it is indicated that the information does not depend on a data structure, "xxx table" can be called "xxx information". Further, in the following description, the configuration of each table is an example, and one table may be divided into two or more tables, or all or a part of two or more tables may be one table.

In addition, in the following description, "computer system" may be at least one among a server system and a storage system. "Server system" may be one or more physical servers (for example, clusters of the servers) or may include at least one virtual server (for example, virtual machine (VM)). Further, "storage system" may be one or more physical storage devices or may include at least one virtual storage device (for example, software defined storage (SDS)).

In addition, in the following description, an identification number is used as identification information of various targets, but other types of identification information other than the identification number (for example, an identifier including an alphabet or a sign) can also be adopted.

In addition, in the following description, there is a case where the processing is described using "program" as the subject, but as the program is executed by the processor (for example, central processing unit (CPU)), in order to appropriately perform the determined processing while using a storage resource (for example, a memory) and/or a communication interface device (for example, a communication port), the subject of the processing may be a processor. The processing described using the program as the subject may be the processing performed by the processor or an apparatus including the processor. In addition, the processor may include a hardware circuit which performs some or all of the processing. The program may be installed in each controller from the program source. The program source may be, for example, a program distribution computer or a storage medium readable by the computer. In addition, in the following description, two or more programs may be realized as one program, or one program may be realized as two or more programs.

In addition, in the following description, the FMD is adopted as an example of the PDEV. A host system of the FMD may be a server system in which the FMD is connected as an external storage, may be the processor unit in the server system including the FMD, or may be a storage controller in the storage system including the FMD.

The FMD includes a flash memory (FM) and an FM controller for controlling input and output of data to and from the FM. The FM is constituted with one or more FM chips. The FM chip is constituted with a plurality of physical regions. Specifically, for example, the FM chip is a NAND flash, and is constituted with a plurality of physical blocks. Each physical block is constituted with a plurality of physical pages. A physical block or a physical page is an example of a physical region. Data is accessed (read and written) in a physical page unit, and the data is erased in a physical block unit. The FM controller provides a virtual address space to the host system and manages a correspondence between a virtual address and an FMD address (for example, holds address conversion information indicating the correspondence between the virtual address and the FMD address). The virtual address is a logical address managed by the FMD, and the FMD address is a physical address managed by the FMD (an address pointing to a physical region in the FM). The FM controller specifies the physical region to which the FMD address that corresponds to the virtual address designated by an I/O command from the host system belongs, and performs I/O with respect to the specified physical region. The virtual address is, for example, a logical block address (LBA), and the FMD address is, for example, a physical block address (PBA).

In addition, in the following description, the FM is log-structured type. Specifically, in a case where the virtual address to which the FMD address of a certain physical page is allocated is a write destination, the FMD address is newly allocated to a write destination virtual address instead of the allocated FMD address, and data pointed by the newly allocated FMD address is written into the physical page (free page). For each virtual address, the data (that is, the latest data) written into the physical page pointed by the recently allocated FMD address is "valid data", the physical page in which the valid data is written is "valid page", the data stored in the physical page pointed by the FMD address allocated in the past is "invalid data", and the page into which the invalid data is written is "invalid page". In addition, the physical page that can store new data without a valid page or an invalid page is "free page".

Embodiment 1

FIG. 1 illustrates an outline of Embodiment 1.

As an example of the computer system, the storage system is employed. The storage system includes one or more FMDs and a storage controller 101 connected to one or more FMDs. The storage controller 101 is an example of the controller including the processor unit.

The FMD is an example of the PDEV having at least one among a compression function and an unmapping function and a capacity virtualization function. The "unmapping function" is a function of canceling the mapping of an actual address (the FMD address in the following description) with respect to the designated virtual address (a physical address in the following description) (management is possible using a region that complies with the canceled physical address as a free space). "Capacity virtualization" is to provide a virtual address space having virtual capacity that does not depend on physical capacity (typically, virtual capacity greater than physical capacity). "Physical capacity" is the physical storage capacity (actual storage capacity) of the FMD. "Virtual capacity" is the virtual storage capacity of the FMD (the storage capacity of the FMD viewed in the host system of the FMD).

The storage controller 101 has a deduplication function as a data amount reduction function. "Deduplication" is to store only some of the data among two or more pieces of duplicated data in the FMD and is not to store the remaining data in the FMD.

In this manner, according to the example, the deduplication is performed by the storage controller 101, and compression is performed by the FMD.

Further, the storage controller 101 manages the logical address space and the physical address space. The logical address space is an address space provided in the host system (for example, server system) of the storage controller 101. The logical address space is typically provided as a logical volume (the logical address space having a logical volume). The physical address space is an address space which is not provided in the host system of the storage controller 101 and is an internal address space in the storage system. The physical address may be equivalent to the virtual address provided by the FMD.

The correspondence between the logical address range and the physical address range may be statically determined or may be dynamically determined (changed). In the former, the internal volume managed in the storage system is allocated to the entire region of the logical volume provided to the server system, and the physical address range may be the address range pointing to the region in the internal volume. In the latter, the physical address range is an address range pointing to an actual region (hereinafter, actual page) allocated from a pool that complies with a dynamic allocation technology, such as thin provisioning technology. The "pool" may be a storage region constituted with a plurality of actual pages (actual storage regions). The storage controller 101 allocates a physical address (actual page) from the pool to the logical address designated by a write request received from the server system. The storage system writes write target data accompanying the write request to the allocated actual page. In the example, the dynamic allocation technology is adopted. In the following description, in order to avoid confusion of the description, an association (for example, an association of the physical address range corresponding to the logical address range) between the logical address range and the physical address range (actual page) is called "allocation". Meanwhile, an association (for example, an association of the logical address corresponding to the physical address) between the logical address that belongs to the logical address range and the physical address that belongs to the physical address range allocated to the logical address range is called "mapping".

In the example, there are two types of mapping, specifically, static mapping and dynamic mapping.

"Static mapping" is as follows. In other words, when the physical address range is allocated to the logical address range, the relationship between the logical address and the physical address is uniquely determined between the address ranges. For example, the head and the rear end of the logical address range and the head and the rear end of the physical address range correspond to each other, and an address value from the head of the logical address range matches the address value from the head of the physical address range. In other words, when the physical address range is allocated to the logical address range, between the address ranges, the logical address and the physical address correspond to each other in advance with 1:1. The correspondence (association) is "static mapping". The physical address of the static mapping address of the logical address may be specified by referring to the table or may be calculated by calculation without referring to the table. For example, the logical address that complies with the static mapping and the address value of the physical address may be the same.

Meanwhile, "dynamic mapping" is the current mapping. In other words, the dynamic mapping differs from the fixed mapping, such as the static mapping, and changes depending on the deduplication processing or duplication withdrawal processing which will be described later. Typically, in a case where the first and second data that duplicate the first and second logical addresses correspond to each other in the logical address range, the first logical address corresponds to the first physical address (static mapping), and the second logical address is not a second physical address (not the static mapping) as the second data is deduplicated, and is dynamically associated with the first physical address that corresponds to the first data that duplicates the deduplicated second data. The dynamic association is "dynamic mapping". In the example, for one logical address range, the dynamic mapping is applied only to the physical address range (for example, an actual page which will be described later) allocated to the logical address range, but the invention is not limited thereto, for example, the dynamic mapping may also be applied to the physical address range different from the physical address range allocated to the logical address range.

As described above, in the example, the FMD has the compression function and the capacity virtualization function, and the storage controller 101 has the deduplication function. There are the static mapping and the dynamic mapping as the mapping between the logical address and the physical address. The storage controller 101 allocates the physical address range to the logical address range in a relatively large unit, such as the actual page, and continues to use the static mapping between the logical address range and the physical address range.

Hereinafter, some cases (examples) A to D will be described with reference to FIG. 1. In addition, in cases A to D, the logical address range includes first to fourth logical addresses. Therefore, the physical address range allocated to the logical address range includes the first to fourth physical addresses which are respectively statically mapped to the first to fourth logical addresses. One piece of data corresponds to one logical address. In addition, the data written in the FMD is compressed and written to the FM by the compression function of the FMD, but in order to avoid the redundancy of the description, there is a case where the description of being compressed is omitted.

<Case A>

The case A is a case where data A that is not deduplicated is updated to data E.

The storage controller 101 writes the data E to the first physical address. The first physical address is a physical address statically mapped to the first logical address that corresponds to the data A. In other words, the storage controller 101 overwrites the data E to the same physical address (first physical address) in the data A without changing the correspondence between the logical address and the physical address. Therefore, the data E is log-structured to the FMD in which the data A is stored. As a result, in the FMD, the data A becomes invalid data from valid data, and the data E becomes effective data instead of the data A.

<Case B>

The case B is a case where the data C that does not duplicate with any data is updated to the data B that duplicates the existing data B (that is, the same data B as the existing data B). In this case, two pieces of data B and B that duplicate with each other are generated in the logical address range.

The storage controller 101 performs the following processing (b1) and (b2).

(b1) The storage controller 101 writes zero data to the pre-update data C that corresponds to a third physical address. Specifically, the storage controller 101 transmits a write command of the zero data to the FMD that corresponds to the third physical address. As a result, the zero data is compressed and log-structured to the FMD, and thus, the pre-update data C becomes invalid data in the FMD. The third physical address is a physical address statically mapped to the third logical address which is the write destination of the updated data B. The zero data is data in which all bits are 0. Compressed zero data (compressed zero data) exists in the FMD as valid data, but since the zero data has a high compression effect, the size of the compressed zero data is smaller than the size of normal compressed data (for example, user data A, B, The zero data is an example of the predetermined data. The predetermined data may be data in which all bits are 1.

(b2) The storage controller 101 dynamically maps the third logical address to the second physical address. The third logical address is the logical address which is the write destination of the updated data B. The second physical address is a physical address statically mapped to the second logical address that corresponds to the existing data B.

By the above-described processing (b1) and (b2), the updated data B is deduplicated. Specifically, it is avoided that the updated data B is log-structured to the FMD.

In addition, in a case where the duplication occurs similar to the case B, it is preferable that the deduplication be performed with respect to the existing data and the updated data among the updated data that duplicate with each other. This is because, for example, when the existing data B is deduplicated, the data B is written to the third physical address, and as a result, the data B is log-structured to the FMD regardless that the data B already exists in the FMD.

Further, in the example, instead of the writing of the zero data to the physical address (the third physical address in the case B), the unmapping command regarding the physical address may be transmitted to the FMD. The unmapping command is a command for instructing unmapping (cancellation of mapping) of the FMD address associated with the physical address (the virtual address provided by the FMD). According to the unmapping command, mapping of the FMD address is canceled, and thus, the usage capacity of the FMD is reduced by the physical address (virtual address) to which the FMD address was mapped. In the example, a method of writing the zero data is adopted as a deduplication method, but as described above, a method of transmitting the unmapping command for the physical address that corresponds to the data to be deduplicated may be adopted. However, in the method of transmitting the unmapping command, it can be necessary to generate parity by assuming that the zero data is written for the physical address. This is because the FMD is designed to return the zero data in a case where a read command that designates the physical address (virtual address) unmapped by the FMD address is received from the storage controller 101. "Zero data" mentioned in the example for the physical address to which the FMD address is unmapped is an example of format data which is data to be returned in response to the read command to the physical address to which the FMD address is not allocated. In the example, not only the data to be written instead of the deduplicated data but also the format data is "zero data".

<Case C>

The case C is a case where the data of the duplication destination out of the duplication source and the duplication destination is updated. "Duplication source" is the side to be referred to, and "duplication destination" is the side to be referred to. In the following description, there is a case where "duplication source" and "duplication destination" are added to at least one among the logical address and the physical address and data as appropriate. "Duplication source logical address" is the logical address of the write destination of duplication source data. "Duplication source physical address" is a physical address statically mapped to the duplication source logical address, that is, a physical address dynamically mapped to duplication destination logical address. "Duplication source data" is data that is not deduplicated among two or more pieces of data to be duplicated. Meanwhile, "duplication destination logical address" is the logical address of the write destination of the duplication destination data, and is a logical address dynamically mapped to the duplication source physical address. "Duplication destination physical address" is the physical address statically mapped to the duplication destination logical address. "Duplication destination data" is deduplicated data out of two or more pieces of data to be duplicated. From the server system, even when two or more pieces of the same data are respectively viewed to exist in two or more logical addresses, on the inside of the storage system, only the data which is regarded as duplication source among the two or more pieces of the same data is written to the FMD, the data (deduplicated data) set as the duplication destination is not written to the FMD.

In a case where the non-duplicated data E is written to the duplication destination data B (in a case where the non-duplicated data E is written to the duplication destination logical address (third logical address)), the storage controller 101 performs the following processing (c1) and (c2).

(c1) The storage controller 101 changes a dynamic mapping destination of the duplication destination logical address (third logical address) from the duplication source physical address (second physical address) to the static mapping destination (third logical address) of the duplication destination logical address (third logical address). In other words, the storage controller 101 allows the dynamic mapping destination to match the static mapping destination with respect to the duplication destination logical address (third logical address).

(c2) The storage controller 101 overwrites the non-duplicated data E in the zero data (zero data that corresponds to the duplication destination data B) that corresponds to the third physical address.

According to the above-described processing (c1) and (c2), a deduplication state is canceled and the non-duplicated data E (updated data E) is log-structured to the FMD.

<Case D>

The case D is a case where the data of the duplication source out of the duplication source and the duplication destination is updated.

In a case where the non-duplicated data E is written to the duplication source data B (in a case where the non-duplicated data E is written to the duplication source logical address (second logical address)), the storage controller 101 performs the following processing (d1) to (d3).

(d1) The storage controller 101 changes the dynamic mapping destination of the duplication destination logical address (third logical address) from the duplication source physical address (second physical address) to the static mapping destination (third logical address) of the duplication destination logical address (third logical address).

(d2) The storage controller 101 copies the duplication source data B from the duplication source physical address (second physical address) to the duplication destination physical address (third physical address). As a result, the zero data that corresponds to the third physical address is overwritten by the duplication source data B.

(d3) The storage controller 101 overwrites the non-duplicated data E in the duplication source data B that corresponds to the second physical address.

According to the above-described processing (d1) to (d3), the deduplication state is canceled and the non-duplicated data E (updated data E) is log-structured to the FMD. In addition, the duplication source data B is also log-structured to the FMD. In addition, since the duplication source data B already exists in the FMD, instead of log-structuring the duplication source data B copied to the third physical address to the FMD, it is considered that the FMD address that corresponds to the data B is associated with the third physical address. However, management of the correspondence between the physical address (in particular, the virtual address) and the FMD address is performed by the FMD, and cannot be controlled by the storage controller 101. Therefore, it is preferable that the data to be written to the physical address be log-structured to the FMD.

As described above, in the example, the FMD has the compression function and the capacity virtualization function, and the storage controller 101 has the deduplication function. There are the static mapping and the dynamic mapping as the mapping between the logical address and the physical address. The storage controller 101 allocates the physical address range to the logical address range in a relatively large unit such as the actual page and uses the static mapping as long as the duplicated data is not generated. Therefore, it is not necessary to change the physical address corresponding to the logical address every time the data is written to the same logical address. In other words, it is not necessary to update the mapping every time the writing is performed. This contributes to alleviating the load on the storage controller 101.

In addition, in the example, the updated data is written to the statically mapped physical address, and the storage controller 101 does not need to perform garbage collection for creating a free space in the physical address range. This also contributes to alleviating the load of the storage controller 101.

In addition, the duplication destination data (deduplicated data) is written as the zero data in the FMD (or unmapping is executed by the FMD with respect to the duplication destination physical address). Therefore, it is possible to reduce the actual usage capacity (physical usage capacity) of the FMD.

Hereinafter, the example will be described in detail.

FIG. 2 illustrates a configuration of the storage system.

A storage system 200 includes a plurality (or one) of FMDs 320 and a storage controller 101 connected to the plurality of FMDs 320. The plurality of FMDs 320 may constitute one or more RGs. RG is the abbreviation of a redundant array of independent (or inexpensive) disks (RAID) group.

The storage controller 101 includes an S-I/F 214, an M-I/F 215, an F-I/F 213, a memory 212, and a processor 211 connected thereto. The S-I/F 214, the M-I/F 215, and the F-I/F 213 are examples of the interface unit. The memory 212 is an example of the storage unit. The processor 211 is an example of the processor unit.

The S-I/F 214 is a communication interface device that mediates exchange of the data between a server system 201 and the storage controller 101. The server system 201 is connected to the S-I/F 214 via a fiber channel (FC) network 203. The server system 201 sends an I/O command which designates an I/O destination (for example, a logical volume number, such as a logical unit number (LUN), or a logical address, such as logical block address (LBA)) to the storage controller 101.

The M-I/F 215 is a communication interface device that mediates the exchange of the data between a management system 205 and the storage controller 101. The management system 205 is connected to the M-I/F 215 via an internet protocol (IP) network 204. The networks 203 and 204 may be the same communication network. The management system 205 manages the storage system 200.

The F-I/F 213 is a communication interface device that mediates the exchange of the data between the plurality of FMDs 320 and the storage controller 101. The plurality of FMDs 320 is connected to the F-I/F 213.

The memory 212 stores programs executed by the processor 211 or data used by the processor 211 therein. The processor 211 executes the program stored in the memory 212. The group of the memory 212 and the processor 211 are duplexed.

FIG. 3 illustrates the configuration of the FMD 320.

The FMD 320 includes a plurality of FMs (FM chips) 320 and an FM controller 300 connected to the plurality of FMs 320. Typically, the FM is a NAND type FM.

The FM controller 300 controls the I/O corresponding to the FM 320. The FM controller 300 includes an L-I/F 313, a U-I/F 314, a compression/expansion circuit 315, a memory 312, and a processor 311 connected thereto.

The U-I/F 314 is a communication interface device connected to the storage controller 101 which is an example of the host system, and mediates data communication between the storage controller 101 and the FM controller 300. The L-I/F 313 mediates data communication between the FM 320 and the FM controller 300. The compression/expansion circuit 315 is hardware for compressing and expanding the data. The compression and expansion may be performed by the processor 311 executing the program instead of the hardware.

The memory 312 stores programs executed by the processor 311 or data used by the processor 311 therein. The processor 311 executes the program stored in the memory 312.

In a case of receiving the write command from the storage controller 101, the FM controller 300 log-structures the data that complies with the write command to the FM 320 by compressing the data by the compression/expansion circuit. Further, in a case of receiving the read command from the storage controller 101, the FM controller 300 reads the data that complies with the read command from the FM 320, expands the data by the compression and expansion circuit, and responds to the storage controller 101.

The FM controller 300 provides the virtual address space to the storage controller 101. The FM controller 300 holds address conversion information indicating the correspondence between the virtual address and the FMD address. The FM controller 300 specifies the physical page to which the FMD address that corresponds to the virtual address designated by the write command or the read command from the storage controller 101 belongs and executes writing or reading with respect to the specified physical page.

FIG. 4 illustrates the configuration of the memory 212 and the programs and information in the memory 212.

The memory 212 includes a memory region called a local memory 401, a cache memory 402, and a shared memory 404. At least one among the memory regions may be an independent memory.

The local memory 401 is used by the processor 211 that belongs to the same group as the memory 212 including the local memory 401. In other words, the local memory 401 is not used by the processor 211 that belongs to the group different from the memory 212 including the local memory 401. In the local memory 401, a read program 411, a front end write program 412, a backend write program 413, an address conversion program 414, a deduplication program 415, and a pool capacity management program 416 are stored. The programs will be described later.

Data to be written to or read from the FMD 320 is temporarily stored in the cache memory 402.

The shared memory 404 is used by both the processor 211 that belongs to the same group as the memory 212 including the shared memory 404 and the processor 211 that belongs to a different group. In the shared memory 404, a VOL management table 421, a page allocation management table 422, a pool management table 423, an RG management table 424, a dynamic mapping table 425, a static mapping table 426, a free space management table 427, a page unit management table 428, and a deduplication management table 429 are stored. The tables will be described later.

FIG. 5 illustrates a storage hierarchy in the storage system 200.

A logical volume 501, a duplication management volume 502, a virtual pool 503, an RG 504, a virtual address space 505, and a FMD address space 506. The address that belongs to the address space that corresponds to the logical volume 501 corresponds to the logical address in FIG. 1. The addresses that belong to the address space that corresponds to duplication management volume 502, the virtual pool 503, the RG 504, and the virtual address space correspond to the physical address in FIG. 1.

The logical volume 501 is a storage space provided in the server system 201.

The duplication management volume 502 is an internal volume (storage space not provided in the server system 201) for the deduplication management. The pool 503 is a storage space (for example, a storage space constituted with a plurality of volumes based on one or more RGs 504) based on one or more RGs 504, and is constituted with a plurality of actual pages. The RG 504 is a storage space constituted with the plurality of FMDs 320 or a plurality of FMD regions (storage regions provided by one or more FMDs 320). The virtual address space 505 is a space provided by the FMD 320. The size of the virtual address space 505 is typically greater than the physical size (total capacity of the plurality of FMs 320) by the capacity virtualization function.

The FMD address space 506 is an internal space (physical space) managed by the FMD 320. The FMD address space 506 is typically equal to the physical size.

In the example, for example, the data is stored as follows.

For example, two pieces of duplicated data A and one piece of non-duplicated data B are stored in the logical volume 501.

Two pieces of duplicated data A are stored inside the storage system 200 as follows.

The duplication source data A is stored for the duplication source physical address statically mapped to the duplication source logical address. The duplication source physical address mentioned here relates to the address of the region in the duplication management volume 502 and the address of the region in the actual page (partial region of the pool 503) allocated to the region (address). As a result, the duplication source data A is compressed and stored in the FMD address space 506 through the RG 504 and the virtual address space 505 (compressed data a).

For the duplication destination data A, duplication destination logical address is dynamically mapped to the duplication source physical address. Instead of the duplication destination data A, the zero data is stored for the duplication destination physical address. The duplication destination physical address mentioned here relates to the address of the region in the duplication management volume 502 and the address of the region in the actual page (partial region of the pool 503) allocated to that region (address). As a result, the zero data is compressed and stored in the FMD address space 506 through the RG 504 and the virtual address space 505.

Meanwhile, the non-duplicated data B is stored inside the storage system 200 as follows. In other words, the data B is stored for the physical address statically mapped to the write destination logical address of the data B without going through the duplication management volume 502. The duplication destination physical address mentioned here relates to the address of the region in the actual page allocated to the logical address. As a result, the data B is compressed and stored in the FMD address space 506 through the RG 504 and the virtual address space 505 (compressed data b).

The cache memory 402 may include a first cache region that corresponds to the logical volume 501 and a second cache region that corresponds to the duplication management volume 502. In this case, the data exchanged with the server system 201 is stored in the first cache region, the data exchanged with the FMD 320 is stored in the second cache region, and the data is appropriately transferred between the first cache region and the second cache region. In addition, as there is the duplication management volume 502, the deduplication management can be separated at the front end and the backend (specifically, for example, the data from the server system 201 is stored in the first cache region and thereafter is deduplicated when the data is transferred to the second cache region). Therefore, the duplication management volume 502 may not be necessarily required, but it is preferable that the duplication management volume 502 exist.

FIG. 6 illustrates a configuration of the duplication management volume 502.

The duplication management volume 502 includes a static mapping space 601 and a log-structured space 602. The static mapping space 601 is a space in which the data is written in accordance with the static mapping. The log-structured space 602 may be an auxiliary storage space (for example, a buffer) of the static mapping space 601. For example, the log-structured space 602 may be used as a save destination of the data or may be used as a temporary storage destination of a hash value (hash value of the data) calculated for determining the presence or absence of the duplicated data.

FIG. 7 illustrates a configuration of a duplication management volume according to one comparative example.

According to a duplication management volume 700 according to one comparative example, the entire region is a log-structured space 701. The log-structured space 701 according to one comparative example is a space where the data is log-structured every time the writing of the data occurs. According to one comparative example, the storage controller needs to perform garbage collection for the log-structured space 701.

FIG. 8 illustrates a configuration of the VOL management table 421.

In the example, both the volume provided to the server system 201 similar to the logical volume 501 and the internal volume which is not provided to the server system 201 similar to the duplication management volume 502 are collectively referred to as "VOL". The VOL management table 421 holds information on the VOL. The VOL management table 421 includes an entry for each VOL. Each entry holds information, such as VOL #801, VOL attribute 802, VOL capacity 803, and pool #804.

The VOL #801 represents the number (identification number) of the VOL. The VOL attribute 802 represents an attribute of the VOL (for example, the logical volume is "logical", and the duplication management volume is "duplication management"). The VOL capacity 803 represents the capacity of the VOL. The pool #804 represents the number of the pool 503 associated with the VOL.

FIG. 9 illustrates a configuration of the page allocation management table 422.

The page allocation management table 422 includes an entry for each region where the actual page can be allocated. Each entry holds information, such as VOL #901, VOL address 902, page #903, and page allocation state 904.

The VOL #901 represents the number of the VOL to which the region belongs. The VOL address 902 is an address pointing to the region. The address is a logical address when the VOL to which the region belongs is a logical volume 501, and is a duplication management address (an address pointing to a region in the duplication management volume 502) when the VOL to which the region belongs is the duplication management volume 502. The page #903 is the number of the actual page allocated to the region. When the actual page is not allocated, the page #903 is "–".

The page allocation state 904 represents the state of the actual page. For example, in a case where the actual page is allocated to the region in the duplication management volume 502, the page allocation state 904 for the region of the duplication management volume 502 is "allocated". Further, for example, in a case where the actual page is not allocated to the region in the logical volume 501 and the actual page is allocated to any region of the duplication management volume 502, for the region of the logical volume 501, the page allocation state 904 is "duplication management state". Further, for example, in a case where the actual page is not allocated to any region in the logical volume 501 and the actual page is not allocated to any region of the duplication management volume 502, the page allocation state 904 is "unallocated". In addition, for example, in a case where the actual pages are allocated for the VOL and the VOL addresses that are not in the "duplication management state", "allocated" state is achieved.

The storage controller 101 may manage a write frequency (update frequency) for each logical address range (region having the same size as the actual page). When the write frequency is less than a threshold value, the storage controller 101 may allocate the actual page to the duplication management volume 502 (for example, the duplication management volume 502 associated with the write destination logical volume 501) for the deduplication management. Meanwhile, when the write frequency is equal to or greater than the threshold value, the storage controller 101 may allocate the actual page to the logical volume 501 (that is, the deduplication processing may not be executed for the logical address range to which the actual page is allocated). This is because, when the write frequency is equal to or greater than the threshold value, there is a high possibility that the non-duplicated data is written as updated data in a short period of time even when the deduplication is performed.

FIG. 10 illustrates a configuration of the pool management table 423.

The pool management table 423 holds information on the pool 503. The pool management table 423 includes an entry for each pool 503. Each entry holds information, such as pool #1001, RG #1002, virtual pool capacity 1003, virtual pool usage capacity 1004, actual pool capacity 1005, actual pool usage capacity 1006, and presence or absence of capacity virtualization function 1007.

The pool #1001 represents the number of the pool 503. The RG #1002 represents the number of one or more RGs 504 on which the pool 503 is based.

The virtual pool capacity 1003 represents the sum of the virtual capacities of the pool 503, specifically, for example, one or more virtual RG capacities (will be described later) that respectively correspond to one or more RGs 504 on which the pool 503 is based.

The virtual pool usage capacity 1004 represents the used capacity of the virtual pool capacity 1003 (typically, the total capacity of the allocated actual pages in the pool 503).

The actual pool capacity 1005 represents the sum of the actual (physical) capacities of the pool 503, and specifically, for example, one or more actual RG capacities (will be described later) that respectively correspond to each of one or more RGs 504 on which the pool 503 is based.

The actual pool usage capacity 1006 represents the sum of the used capacity of the actual pool capacity 1005, and for example, one or more actual RG usage capacities (will be described later) that respectively correspond to each of one or more RGs 504 on which the pool 503 is based.

The presence or absence of capacity virtualization function 1007 represents whether or not the pool 503 has a capacity virtualization function. When all of the one or more RGs 504 on which the pool 503 is based have the capacity virtual function, the presence or absence of capacity virtualization function 1007 is "present".

In addition, in the example, in order to make the description easy to understand, the entire virtual RG capacity of one RG 504 corresponds to one pool 503, but a part of the virtual RG capacity may be used in the pool 503 and the remaining may be used for other uses (for example, other pool 503).

FIG. 11 illustrates a configuration of the RG management table 424.

The RG management table 424 holds the information on the RG 504. The RG management table 424 includes an entry for each RG 504. Each entry holds information, such as RG #1101, FMD #1102, RAID level 1103, virtual RG capacity 1104, actual RG capacity 1105, actual RG usage capacity 1106, and presence or absence of capacity virtualization function 1107.

The RG #1101 represents the number of RG 504. The FMD #1102 represents the number of the plurality of FMDs 320 that constitute the RG 504. The RAID level 1103 represents the RAID level 1103 of the RG 504 (may include a RAID configuration, such as 3D+1P).

The virtual RG capacity 1104 is a virtual capacity of the RG 504, and specifically, the total capacity of the plurality of virtual address spaces provided by each of the plurality of FMDs 320 that constitute the RG 504.

The actual RG capacity 1105 represents the sum of the actual capacity of the RG 504, and specifically, the actual capacities (the total capacity of the FMs 320) of the plurality of FMDs 320 that constitute the RG 504.

The actual RG usage capacity 1106 represents the sum of the used capacity of the actual RG capacity 1105, and specifically, the plurality of actual usage capacities that respectively correspond to the plurality of FMDs 320 that constitute the RG 504. For one FMD 320, "actual usage capacity" is the total amount of the valid data. In the FMD 320 having the compression function and the capacity virtualization function, the valid data is compressed data. The actual RG usage capacity 1106 is updated by capacity calculation processing. The capacity calculation processing is executed periodically as follows, for example. The pool 503 capacity management program 416 transmits an inquiry of the actual usage capacity to each of the plurality of FMDs 320 that constitute the RG 504. The pool 503 capacity management program 416 calculates the actual RG usage capacity 1106 based on the plurality of answers (actual usage capacity) which are respectively obtained from the plurality of FMDs 320. In the example, the FMD 320 having the capacity virtualization function has a function of receiving an inquiry about the actual usage capacity and answering the actual usage capacity to the inquiry.

The presence or absence of capacity virtualization function 1107 indicates whether or not the RG 504 has a capacity virtualization function. When all of the plurality of FMDs 320 on which the RG 504 is based have the capacity virtual function, the RG 504 has the capacity virtualization function.

FIG. 12 illustrates a configuration of the dynamic mapping table 425.

The dynamic mapping table 425 represents the dynamic mapping between the logical address and the physical address (here, a duplication management address). The dynamic mapping table 425 includes an entry for each dynamic mapping. Each entry holds information, such as VOL #1201, VOL address 1202, duplication management volume #1203, duplication management address 1204, and deduplication state 1205.

The VOL #1201 represents the number of the VOL (here, the logical volume 501). The VOL address 1202 represents an address (here, the logical address) pointing to the VOL region. The duplication management volume #1203 represents the number of the duplication management volume 502 including the region in which the corresponding VOL # and VOL address are dynamically mapped. The duplication management address 1204 represents an address pointing to a region (region in the duplication management volume 502) where the corresponding VOL #1201 and the VOL address 1202 are dynamically mapped.

The deduplication state 1205 represents a state related to the deduplication. "With duplication (duplication source)" means that the VOL address is a duplication source. "With duplication (duplication destination)" means that the VOL address is a duplication destination. "No duplication" means a state where there is no duplicated data for the corresponding VOL address (logical address), that is, a case where the dynamic mapping destination of the corresponding VOL address (logical address) matches the static mapping destination of the VOL address (logical address).

FIG. 13 illustrates a configuration of the static mapping table 426.

The dynamic mapping table 426 represents the static mapping between the logical address and the physical address (here, the duplication management address 1204). The static mapping table 426 includes an entry for each static mapping. Each entry holds information, such as VOL #1301, VOL address 1302, duplication management volume #1303, and duplication management address 1304.

The VOL #1301 represents the number of the VOL (here, logical volume 501). The VOL address 1302 represents an address (here, logical address) pointing to the VOL region. The duplication management volume #1303 represents the number of the duplication management volume 502 including the region in which the corresponding VOL # and VOL address are statically mapped. The duplication management address 1304 represents an address pointing to a region (region in the duplication management volume 502) where the corresponding VOL # and the VOL address are statically mapped.

According to FIG. 13, for example, the static mapping is as follows. In other words, a head address (VOL address 1302 "0") of the logical volume "0" is statically mapped to the head address (duplication management address 1302 "0") of the duplication management volume "100", and the subsequent VOL address and the duplication management address are also statically mapped by 1:1.

FIG. 14 illustrates a configuration of the free space management table 427.

The free space management table 427 represents a free region in the log-structured space 602 of the duplication management volume 502. The free space management table 427 includes an entry for each duplication management volume 502. Each entry holds information, such as duplication management volume #1401, head address 1402, end address 1403, used address 1404, and released address 1405.

The duplication management volume #1401 represents the number of duplication management volume 502. The head address 1402 represents the head address of the log-structured space 602. The end address 1403 represents the end address of the log-structured space 602. The used address 1404 represents the head or end address of the used region in the log-structured space 602. The released address 1405 represents the head or end address of the released region in the log-structured space 602.

In log-structured space 602, the data is log-structured or overwritten. For example, when a state of the logical address which is the dynamic mapping destination is a state where there is no duplication, the region in the log-structured space 602 may be overwritten (specifically, the data may be overwritten in the region in the log-structured space 602) or may be log-structured (specifically, the dynamic mapping destination may be changed to a free region in the log-structured space 602 and the data may be written into the free region). In addition, for example, regarding the logical addresses in which the region in the log-structured space 602 is not a dynamic mapping destination, the log-structure may be performed (specifically, the dynamic mapping destination of the logical address is changed to a free region in the log-structured space 602 and the data may be written into the free region data). In a case where the used address 1404>the released address 1405 is satisfied, the region (released region) from the head address 1402 to the released address 1405 and the region from the used address 1404 to the end address 1403 are free regions, and the region from the released address 1405 to the used address 1404 is the used region. Meanwhile, in a case where the used address 1404<the released address 1405 is satisfied, the region from the head address 1402 to the used address 1404 and the region from the released address 1405 to the end address 1403 are used regions, and the region from the used address 1404 to the released address 1405 (released region) is the free region.

FIG. 15 illustrates a configuration of the page unit management table 428.

The page unit management table 428 holds the information on the actual page. The page unit management table 428 includes an entry for each actual page. Each entry holds information, such as page #1501, VOL #1502, VOL address 1503, virtual RG #1504, virtual RG address 1505, presence or absence of deduplication 1506, and allocation destination attribute 1507.

The page #1501 represents the number of the actual page. The VOL #1502 represents the number of the VOL to which the actual page is allocated. The VOL address 1503 represents an address pointing to the region (region in the VOL) to which the actual page is allocated. The virtual RG #1504 represents the number of the virtual RGs including the actual page. "Virtual RG" is a part of the pool 503 and is a space (region) provided by the RG 504. The virtual RG address 1505 is an address pointing to the region (actual page) in the virtual RG. The presence or absence of deduplication 1506 represents whether or not the deduplication is performed in the actual page. The presence or absence of deduplication 1506 for the actual page which is neither the duplication source nor the duplication destination (the zero data on the VOL) is "absent". The allocation destination attribute 1507 represents an attribute (for example, "logical volume" and "duplication management volume") of the VOL including the allocation destination region of the actual page. Due to the existence of the page unit management table 428, in a case where the duplicated data (generic name of the duplication source data and the duplication destination data) is not included in the actual page, the storage controller 101 (processor 211) can specify the duplication management address only by the static mapping and it is not necessary to refer to the dynamic mapping table 425. There is a case where the dynamic mapping table 425 includes a large amount of information, and thus, hierarchical management or directory management are desirable, and thus, there is a case where the access overhead to the table 425 increases. Meanwhile, the static mapping table 426 includes a smaller amount of information than that of the dynamic mapping table 425, and thus, the structure is simple and the access overhead is small. In a case where the deduplication is not performed in an actual page unit, when it is possible to specify that the presence or absence of deduplication 1506 is "absent", it is possible to reduce the processing overhead.

FIG. 16 illustrates the configuration of the deduplication management table 429.

The deduplication management table 429 represents the position (logical address) of the data that duplicates the data. For example, the deduplication management table 429 has a hash value as a key for each piece of data stored in the storage system 200. The VOL # and the VOL address (for example, the logical volume number and the logical address) which represents a region in which the data having a hash value that duplicates the key is stored are associated with each key (hash value).

FIG. 17 illustrates a pool list screen.

The pool list screen 1700 is an example of a management screen. The management screen is a screen displayed by the management system 205 based on information from the storage system 200.

Pool list information is displayed on the pool list screen 1700. The pool list information is information that complies with the pool management table 423. In other words, the pool # corresponds to the pool # 1001, the logical capacity and the logical usage capacity correspond to the virtual pool capacity 1003 and the virtual pool usage capacity 1004, and the actual capacity and the actual usage capacity correspond to the actual pool capacity 1005 and the actual pool usage capacity 1006. The reduction rate (%) corresponds to (actual usage capacity/virtual pool usage capacity)×100 (the first decimal place is rounded off). The reduction rate is calculated by one of the storage controller 101 and the management system 205.

The administrator sees the pool list screen 1700, and for example, can determine to add the pool 503 in which a difference between the logical capacity and the logical usage capacity is less than the threshold value, and the RG 504 (or volume based on the RG 504) to at least one pool 503 among the pools 503 in which the difference between the actual capacity and the actual usage capacity is less than the threshold value.

Hereinafter, the processing performed in the example will be described.

FIG. 18 illustrates a flow of front end write processing.

The front end write processing is processing started in a case where a data write request is received from the server system 201, and is processing of writing the data into the first cache region (cache region that corresponds to the write destination logical volume 501 that complies with the write request). The front end write processing is executed by the front end write program 412. Data transfer between the first cache region and the second cache region (cache region that corresponds to the duplication management volume 502) is executed by the address conversion program 414. In the description of FIG. 18, the data that complies with the received write request is expressed as "data W".

In S1801, the front end write program 412 determines whether or not a cache hit occurred for the first cache region. Regarding the write request, "cache hit" means that a cache segment (region in the cache memory 402) that corresponds to the write destination that complies with the write request is ensured.

In a case where the determination result in S1801 is false (S1801: NO), in S1802, the front end write program 412 ensures the cache segment from the first cache region.

In S1803, the front end write program 412 writes the data W to the ensured cache segment.

In S1804, the front end write program 412 determines whether or not the duplication management volume 502 is associated with the logical volume 501 of the data write destination (that is, whether or not the logical volume 501 of the write destination is the VOL to be deduplicated), based on the VOL management table 421.

In a case where the determination result in S1804 is true (S1804: YES), in S1805, the front end write program 412 determines whether or not the page allocation state 904 that corresponds to the write destination is "duplication management state", based on the page allocation management table 422. In addition, in a case where the page allocation state 904 that corresponds to the write destination is "unallocated", in S1805, an unallocated actual page (free actual page) is selected as the allocation target and the actual page may be allocated.

In a case where the determination result in S1805 is true (S1805: YES), in S1806, the front end write program 412 loads a data W command in a deduplication dirty queue. The command is a duplication management processing command.

In a case where the determination result in S1804 or S1805 is false (S1804: NO or S1805: NO), in S1807, the front end write program 412 loads the data W command in a destage dirty queue. The command is a command of destage (writing the data from the cache memory 402 to the FMD 320).

In S1808, the front end write program 412 returns a GOOD response (write completion report) to a transmission source of the write request (server system 201).

FIG. 19 illustrates a flow of duplication management processing.

In step S1901, the address conversion program 414 refers to the deduplication dirty queue.

In step S1902, the address conversion program 414 determines whether or not there is dirty data.

In a case where the determination result in S1902 is true (S1902: YES), in S1903, the address conversion program 414 selects the dirty data from the deduplication dirty queue.

In step S1904, the address conversion program 414 determines whether or not the size of the dirty data ("selected dirty data" in the description of FIGS. 19 to 22 and 37) selected in S1903 is less than a deduplication unit size. "Deduplication unit size" is the unit size of the data to be compared for the deduplication.

In a case where the determination result in S1904 is true (S1904: YES), in S1905, the address conversion program 414 executes full dirtification processing (FIG. 20). Accordingly, the full dirty data is generated in the logical volume 501. "Full dirty data" is data constituted with the selected dirty data and at least one among the zero data and the insufficient data (will be described later), and is data having the same size as the deduplication unit size.

In S1906, the address conversion program 414 calls the deduplication program 415. The deduplication processing (FIG. 21) is executed by the deduplication program 415.

In S1907, the address conversion program 414 determines whether or not data write necessity is set in the deduplication processing in S1906.

In a case where the determination result in S1907 is true (S1907: YES), in S1908, the address conversion program 414 executes cache transfer processing (FIG. 22).

In S1909, the address conversion program 414 discards the selected dirty data from the first cache region (cache region that corresponds to the logical volume 501).

FIG. 20 illustrates a flow of the full dirtification processing.

In S2001, the address conversion program 414 determines whether or not the presence or absence of capacity virtualization is "present" for the pool 503 including the allocated actual page, based on the pool management table 423.

In a case where the determination result in S2001 is true (S2001: YES), in S2002, the address conversion program 414 determines whether or not the presence or absence of deduplication 1506 is "present" for the actual page that corresponds to selected dirty data, based on the page unit management table 428.

In a case where the determination result in S2002 is true (S2002: YES), in S2003, the address conversion program 414 specifies the duplication management address that corresponds to the logical address (VOL address 1202) of the selected dirty data, based on the dynamic mapping table 425.

In a case where the determination result in S2002 is false (S2002: NO), in S2004, the address conversion program 414 calculates the duplication management address that corresponds to the logical address (VOL address 1202) of the selected dirty data, based on the static mapping table 426.

In S2005, the address conversion program 414 determines whether or not a cache miss occurred with respect to the second cache region (cache region that corresponds to the duplication management volume 502). The cache miss means that the cache segment is not ensured in the second cache region for the specified or calculated duplication management address 1204 ("target duplication management address" in the description of FIG. 20).

In a case where the determination result in S2005 is true (S2002: YES), in S2006, the address conversion program 414 determines whether or not the actual page was allocated to the target duplication management address, based on the page unit management table 428.

In a case where the determination result of S2006 is true S2006: YES), in S2007, the address conversion program 414 specifies the FMD 320 (and the virtual address provided by the FMD 320) on which the allocated actual page is based, based on the page unit management table 428 and the RG management table 424.

In S2008, the address conversion program 414 ensures the cache segment from the second cache region, and reads out (stages) the data (at least the data having the size equal to or greater than the deduplication unit size and including the data updated by the selected dirty data) in the allocated actual page from the specified FMD 320 to the second cache region (ensured cache segment). The size of the cache region may be the same or greater than the deduplication unit size.

In S2009, the address conversion program 414 transfers insufficient data to an insufficient region in the first cache region from the second cache region (ensured cache segment). "Insufficient region" is a region that is not occupied by the selected dirty data among the regions having the same size as the full dirty data size (deduplication unit size). "Insufficient data" is a difference between the data for the full dirty data size (at least a part of the staged data) and the selected dirty data.

In a case where the determination result in S2006 is false (S2006: NO), in S2010, the address conversion program 414 writes the zero data to the insufficient region in the first cache region. "Insufficient region" is a region that is not occupied by the selected dirty data among the regions having the same size as the size of full dirty data size.

According to the above-described S2009 and S2010, the full dirty data including the selected dirty data can be in the first cache region (cache region that corresponds to the logical volume 501).

FIG. 21 illustrates a flow of the deduplication processing.

In S2101, the deduplication program 415 determines whether or not there is the duplicated data in the full dirty data, based on the deduplication management table 429. The "full dirty data" here is entirely or partially selected dirty data.

In a case where the determination result in S2101 is true (S2101: YES), in S2102, the deduplication program 415 updates the dynamic mapping table 425. For example, this corresponds to the case B in FIG. 1, and corresponds to FIG. 31 when referring to the drawings to be described later. In other words, the VOL address (logical address) that corresponds to the full dirty data is dynamically mapped to the duplication management address that corresponds to the data which duplicates the full dirty data. The VOL address (logical address) is the duplication destination VOL address (logical address), and the duplication management address dynamically mapped from the duplication destination VOL address (logical address) is the duplication source duplication management address. In addition, the full dirty data is the duplication destination data, and the data which duplicates the full dirty data is the duplication source data.

In S2103, the deduplication program 415 determines whether or not the presence or absence of capacity virtualization function 1007 is "present" for the pool 503 including the allocated actual page, based on the pool management table 423.

In a case where the determination result in S2103 is true (S2103: YES), in S2104, the deduplication program 415 updates the information on the duplication source. For example, the presence or absence of deduplication 1506 that corresponds to the actual page in which the duplication source data is stored is set to "present". The deduplication state 1205 that corresponds to the duplication source management address is set to "with duplication (duplication source)".

In S2105, the deduplication program 415 updates the information on the duplication destinations. For example, the presence or absence of deduplication 1506 that corresponds to the actual page in which the duplication destination data is stored is set to "present". The deduplication state 1205 that corresponds to a duplication destination duplication management address is set to "with duplication (duplication destination)".

In S2106, the deduplication program 415 updates the deduplication management table 429. In other words, the VOL # and the VOL address of the write destination of the full dirty data are associated with the key (hash value) of the full dirty data.

In S2107, the deduplication program 415 writes the zero data to the static mapping space 601, more specifically, the address statically mapped to the write destination logical address of the full dirty data. The zero data is actually written to the cache segment that corresponds to the address that is statically mapped.

In S2108, the deduplication program 415 sets the zero data written in S2107 as the dirty data (manages the cache segment in which the zero data is written as a dirty segment). Specifically, for example, a command on the zero data is loaded in the destage dirty queue.

In a case where the determination result of S2103 is false (S2103: NO) (that is, when there is the case of the above-described comparative example), in S2109, the deduplication program 415 updates the information on the duplication source. For example, similar to S2104, the presence or absence of deduplication 1506 and the deduplication state 1205 are updated.

In S2110, the deduplication program 415 updates information on the duplication destinations. For example, similar to S2105, the presence or absence of deduplication 1506 and the deduplication state 1205 are updated.

In S2111, the deduplication program 415 updates the deduplication management table 429.

In a case where the determination result in S2101 is false (S2101: NO), in S2121, the deduplication program 415 sets the data write necessity for the full dirty data.

FIG. 22 illustrates a flow of the cache transfer processing.

In S2201, the address conversion program 414 determines whether or not the presence or absence of capacity virtualization is "present" for the pool 503 including the allocated actual page, based on the pool management table 423.

In a case where the determination result in S2201 is true (S2201: YES), in S2202, the address conversion program 414 executes overwrite cache write processing.

In a case where the determination result in S2201 is false (S2201: NO), in S2203, the address conversion program 414 executes the overwrite cache write processing. In the processing, the full dirty data is log-structured in the second cache region. The fact that the processing is performed means that the duplication management volume 502 is the duplication management volume 502 (FIG. 7) according to one comparative example.

FIG. 37 illustrates a flow of the overwrite cache write processing.

The overwrite cache write processing is a part of the cache transfer processing. The cache transfer processing is executed in a case where the data write necessity is set (S2121 in FIG. 21). The data write necessity is executed in a case where the data that duplicates the full dirty data (selected dirty data) is not found (S2101: NO in FIG. 21). Therefore, the overwrite cache write processing corresponds to the case A, the case C, and the case D in FIG. 1. Further, in the drawings which will be described later, the processing corresponds to FIG. 32 or 33.

In S3700, the address conversion program 414 determines whether or not the presence or absence of deduplication 1506 that corresponds to the allocated actual page is "present", based on the page unit management table 428.

In a case where the determination result of S3700 is true (S3700: YES), in S3701, the address conversion program 414 determines whether or not the deduplication state 1205 of the address that corresponds to the old data (pre-update data to be updated by the full dirty data) is "with duplication" (specifically, either "with duplication (duplication source)" or "with duplication (duplication destination)"), based on the dynamic mapping table 425.

In a case where the determination result in S3700 or S3701 is false (S3700: NO or S3701: NO), in S3702, the address conversion program 414 calculates the write destination duplication management address of the full dirty data and calculates the cache address that complies with the address.

In a case where the determination result in S3701 is true (S3701: YES), in S3703, the address conversion program 414 determines whether or not the deduplication state 1205 of the address that corresponds to the old data is "with duplication (duplication destination)".

In a case where the determination result in S3703 is true (S3703: YES), in S3704, the address conversion program 414 specifies the duplication destination duplication management address statically mapped to the duplication destination logical address based on the static mapping table 426, and calculates a cache address (address of the cache segment) that complies with the specified address.

In a case where the determination result of S3703 is false (S3703: NO), in S3705, the address conversion program 414 specifies a free region based on the free space management table 427, and calculates the cache address (address of cache segment) that complies with the address of the free region.

In S3706, the address conversion program 414 ensures the cache segment that complies with the address calculated in S3702, S3704, or S3705 from the second cache region (S3706).

In S3707, the address conversion program 414 writes the full dirty data to the cache segment ensured in S3706.

In S3708, the address conversion program 414 determines whether or not there is a mapping destination change. For example, in a case which is similar to the case C in FIG. 1, since the dynamic mapping matches the static mapping, the determination result in S3708 is true.

In a case where the determination result in S3708 is true (S3708: YES), in S3709, the address conversion program 414 updates the dynamic mapping table 425. For example, the dynamic mapping destination is assumed to be the same as the static mapping destination.

In S3710, the address conversion program 414 updates the deduplication management table 429.

FIG. 23 illustrates a flow of backend write processing.

The backend write processing is processing of destaging from the cache memory 402 to the FMD 320. The backend write processing is performed asynchronously with the processing that complies with the write request (front end write processing) (for example, the processing is performed periodically), but may be performed as a part of the processing that complies with the write request. In the latter, in a case where the destaging of the full dirty data is completed, a GOOD response for the write request is returned.

In S2301, the backend write program 413 refers to the destage dirty queue.

In step S2302, the backend write program 413 determines whether or not there is the dirty data to be destaged.

In a case where the determination result in S2302 is true (S2302: YES), in S2303, the backend write program 413 selects the dirty data.

In step S2304, the backend write program 413 destages (writes) the dirty data selected in step S2304 to the FMD 320. When necessary, the parity is generated or updated using the dirty data. In addition, in a case where the dirty data is the zero data, transmission of the above-described unmapping command may be performed instead of destaging of the zero data. In this case, when necessary, the parity may be generated or updated using the zero data.

Several processing in the example will be described schematically.

FIG. 31 is a schematic view of an example of a case where the updated data duplicates the existing data in the logical volume 501. The case illustrated in FIG. 31 is an example of a case of S2101: YES in FIG. 21.

There are the data B, C, A, and A in the logical volume 501. The data B, C, A, and A correspond to the first to fourth logical addresses, respectively. First to fourth duplication management addresses are statically mapped to the first to fourth logical addresses. The first to fourth duplication management addresses are addresses that belong to the static mapping space 601 and are not addresses that belong to the log-structured space 602. The third logical address (duplication destination) is dynamically mapped to the fourth duplication management address (duplication source), and the zero data is written to the third duplication management address (duplication destination).

In the situation, the updated data A is written to the second logical address. In this case, the duplication source data A that duplicates the updated data A is specified. The second logical address (duplication destination) is dynamically mapped to the fourth duplication management address (duplication source) (reference numeral (1)). The zero data is written to the second duplication management address (duplication destination) at which the second logical address is statically mapped (reference numeral (2)).

FIG. 32 is a schematic view of an example of a case where a write destination of non-duplicated updated data is a duplication destination logical address. The case illustrated in FIG. 32 is an example of a case of S3703: YES in FIG. 37.

After the update illustrated in FIG. 31, the non-duplicated data C is written to the second logical address (duplication destination). In this case, the dynamic mapping destination of the second logical address (duplication destination) is switched from the fourth duplication management address (duplication source) to the static mapping destination (second duplication management address) of the second logical address (duplication destination) (reference numeral (1)). The updated data C is written to the second duplication management address at which the second logical address is statically mapped (reference numeral (2)).

FIG. 33 is a schematic view of an example of a case where a write destination of the non-duplicated updated data is a duplication source logical address. The case illustrated in FIG. 33 is an example of a case of S3703: NO in FIG. 37.

After the update illustrated in FIG. 31, the non-duplicated data C is written to the fourth logical address (duplication source). In this case, a free address in the log-structured space 602 is associated with the fourth logical address (duplication source) (reference numeral (1)). In other words, the free address is dynamically mapped to the fourth logical address (duplication source). The data C is written to the free region pointed by the free address (reference numeral (2)). The second and third logical addresses remain dynamically mapped to the fourth duplication management address including the duplication source data A.

FIG. 34 is a schematic view of an example of a case where the updated data does not duplicate with any existing data in the logical volume 501. The case illustrated in FIG. 34 is an example of a case of S3700: NO or S3701: NO in FIG. 37.

After the update illustrated in FIG. 33, the non-duplicated data D is written to the fourth logical address. In this case, the data D is written in the dynamic mapping destination region (region in the log-structured space 602) of the fourth logical address.

As illustrated in FIGS. 33 and 34, in a case where the duplication source data that corresponds to the duplication source logical address is updated, by dynamically mapping the duplication source logical address to a free region in the log-structured space 602, it is possible to update the data of which deterioration of the I/O performance is alleviated (that is, it is possible to update the data having the I/O performance to the same extent of that in a case where the duplication destination data that corresponds to the duplication destination logical address is updated).

The dynamic mapping for the region in the log-structured space 602 is eliminated by the duplication withdrawal processing.

FIG. 35 is a schematic view of an example of the duplication withdrawal processing.

The duplication withdrawal processing after the update illustrated in FIG. 33 is performed. In the duplication withdrawal processing, for example, the following processing is performed.

The address conversion program 414 copies the duplication source data A to any of the duplication destination duplication management address (reference numeral (1)). An example of a copy source is the fourth duplication management address, and an example of a copy destination is the second duplication management address. The zero data in the second duplication management address is overwritten with the data A in the fourth duplication management address and the second duplication management address becomes the duplication source from the duplication destination.

The address conversion program 414 updates the dynamic mapping for the static mapping space 601 (reference numeral (2)). In other words, the address conversion program 414 changes the dynamic mapping destination of the second logical address from the fourth duplication management address to the static mapping destination (second duplication management address) of the second logical address. In addition, the address conversion program 414 changes the dynamic mapping destination of the third logical address from the fourth duplication management address to the second duplication management address.

The address conversion program 414 copies the data C in the region in the log-structured space 602 to the fourth duplication management address which is the static mapping destination of the fourth logical address dynamically mapped to the region (reference numeral (3)). The address conversion program 414 changes the dynamic mapping destination of the fourth logical address from the region in the log-structured space 602 to the static mapping destination of the fourth logical address (fourth duplication management address) (reference numeral (4)). The address conversion program 414 releases the region (dynamically mapped region) in the log-structured space 602 (reference numeral (5)). For example, the zero data is written into the region.

As the duplication withdrawal processing is performed, even when the dynamic mapping is generated for the region in the log-structured space 602 by updating the duplication source data that corresponds to the duplication source logical address, it is possible to appropriately return to a normal state (a state where the dynamic mapping is not performed for the region in the log-structured space 602). Therefore, garbage collection of the log-structured space 602 becomes unnecessary.

Embodiment 2

Embodiment 2 will be described. At this time, the differences from Embodiment 1 will be mainly described, and the description of the common points with Embodiment 1 will be omitted or simplified.

In a case where the size of the dirty data is less than the deduplication unit size, the full dirtification processing is executed for the logical address (logical volume) in Embodiment 1, but the full dirtification processing is executed for the duplication management address (duplication management volume) in Embodiment 2. In other words, in Embodiment 2, a layer on which the full dirty data is generated is different from that in Embodiment 1.

FIG. 24 illustrates a flow of the duplication management processing according to Embodiment 2.

In step S2401, the address conversion program 414 refers to the deduplication dirty queue. The deduplication dirty queue is a command queue for the dirty data on the logical volume 501.

In step S2402, the address conversion program 414 determines whether or not there is dirty data.

In a case where the determination result in S2402 is true (S2402: YES), in S2403, the address conversion program 414 selects the dirty data from the deduplication dirty queue. The dirty data selected here is referred to as "selected dirty data" in the description of FIGS. 24 to 27.

In S2404, the address conversion program 414 executes the cache transfer processing.

In S2405, the address conversion program 414 calls the deduplication program 415. The deduplication processing (FIG. 27) is executed by the deduplication program 415.

In S2406, the address conversion program 414 discards the selected dirty data from the first cache region (cache region that corresponds to the logical volume 501).

FIG. 25 illustrates a flow of the cache transfer processing according to Embodiment 2.

In S2501, the address conversion program 414 determines whether or not the deduplication state 1205 that corresponds to the logical address (VOL address) for the selected dirty data is "no duplication", based on the dynamic mapping table 425.

In a case where the determination result in S2501 is true (S2501: YES), in S2502, the address conversion program 414 specifies the duplication management address dynamically mapped to the logical address for the selected dirty data based on the dynamic mapping table 425, and calculates the cache address (address of the cache segment) that complies with the specified address. The specified duplication management address is an address pointing to a region that belongs to the log-structured space 602.

In S2503, the address conversion program 414 copies the selected dirty data from the first cache region (cache region that corresponds to the logical volume 501) to the region pointed by the address calculated in S2502 (region in the second cache region).

In a case where the determination result in S2501 is false (S2501: NO), in S2504, the address conversion program 414 determines whether or not the deduplication state 1205 of the logical address that corresponds to the selected dirty data is "with duplication (duplication destination)".

In a case where the determination result in S2504 is true (S2504: YES), in S2505, the address conversion program 414 specifies the duplication destination duplication management address statically mapped to the duplication destination logical address based on the static mapping table 426, and calculates a cache address (address of the cache segment) that complies with the specified address.

In a case where the determination result of S2504 is false (S2504: NO), in S2506, the address conversion program 414 specifies a free region based on the free space management table 427, and calculates the cache address (address of the cache segment) that complies with the address of the free region.

In S2507, the address conversion program 414 determines whether or not the size of the selected dirty data is less than the deduplication unit size.

In a case where the determination result in S2507 is true (S2507: YES), in S2508, the address conversion program 414 executes the full dirtification processing (FIG. 26).

In S2509, the address conversion program 414 copies the selected dirty data from the first cache region (cache region that corresponds to the logical volume 501) to a staging destination region in S2508 (region in the second cache region).

In S2510, the address conversion program 414 updates the dynamic mapping table 425.

According to the above-described S2508 and S2509, the full dirty data including the selected dirty data can be in the second cache region (cache region that corresponds to the duplication management volume 502).

FIG. 26 illustrates a flow of the full dirtification processing according to Embodiment 2.

In S2601, the address conversion program 414 determines whether or not the presence or absence of capacity virtualization is "present" for the pool 503 including the allocated actual page, based on the pool management table 423.

In a case where the determination result in S2601 is true (S2601: YES), in S2602, the address conversion program 414 determines whether or not the presence or absence of deduplication 1506 is "present" for the actual page that corresponds to selected dirty data, based on the page unit management table 428.

In a case where the determination result in S2602 is true (S2602: YES), in S2603, the address conversion program 414 specifies the duplication management address that corresponds to the logical address (VOL address 1202) of the selected dirty data, based on the dynamic mapping table 425.

In a case where the determination result in S2602 is false (S2602: NO), in S2604, the address conversion program 414 calculates the duplication management address that corresponds to the logical address (VOL address 1202) of the selected dirty data, based on the static mapping table 426.

In S2605, the address conversion program 414 determines whether or not a cache miss occurred with respect to the second cache region (cache region that corresponds to the duplication management volume 502).

In a case where the determination result in S2605 is true (S2605: YES), in S2606, the address conversion program 414 determines whether or not the actual page was allocated to the target duplication management address, based on the page unit management table 428.

In a case where the determination result of S2606 is true S2606: YES), in S2607, the address conversion program 414 specifies the FMD 320 (and the virtual address provided by the FMD 320) on which the allocated actual page is based, based on the page unit management table 428 and the RG management table 424.

In S2608, the address conversion program 414 ensures the cache segment from the second cache region, and reads out (stages) the data (at least the data which includes the data updated by the selected dirty data and has the size equal to or greater than the deduplication unit size) in the allocated actual page from the specified FMD 320 to the second cache region (ensured cache segment).

In S2609, the address conversion program 414 transfers the insufficient data to the insufficient region in the second cache region (ensured cache segment).

In a case where the determination result in S2606 is false (S2606: NO), in S2610, the address conversion program 414 writes the zero data to the insufficient region in the second cache region.

FIG. 27 illustrates a flow of the deduplication processing according to Embodiment 2.

In S2701, the deduplication program 415 selects the full dirty data in the second cache region.

In S2702, the deduplication program 415 refers to the deduplication management table 429 and determines whether or not there is data that duplicates the selected full dirty data.

In a case where the determination result in S2702 is true (S2702: YES), in S2703, the deduplication program 415 updates the dynamic mapping table 425. Specifically, the deduplication program 415 dynamically maps the logical address statically mapped to the duplication management address pointing to the region where the full dirty data selected in S2701 exists, to the duplication source duplication management address.

In S2704, the deduplication program 415 writes the zero data to the region (region in the second cache region) where the full dirty data selected in S2701 exists.

Embodiment 3

Embodiment 3 will be described. At this time, the differences from Embodiments 1 and 2 will be mainly described, and the description of the common points with Embodiments 1 and 2 will be omitted or simplified.

In Embodiment 3, the duplication source data is stored in the log-structured space 602 (buffer space). The deduplication processing is performed asynchronously with the processing that complies with the write request.

FIG. 28 illustrates a part of a flow of the deduplication processing according to Embodiment 3.

In a case of S2103: YES, the deduplication program 415 copies the duplication source data to the log-structured space 602. After this, S2104 is executed.

FIG. 36 is a schematic diagram of an example of the deduplication according to Embodiment 3.

The updated data B is written to the third logical address. The updated data B duplicates the existing data B that corresponds to the second logical address.

In this case, the deduplication program 415 copies the data B that serves as the duplication source from the static mapping space 601 to the log-structured space 602 (or writes the updated data B in the log-structured space 602). The deduplication program 415 dynamically maps the second and third logical addresses to the copy destination region (region in the log-structured space 602), respectively. The deduplication program 415 writes the zero data to each of the second and third duplication management addresses which are static mapping destinations that respectively correspond to the second and third logical addresses.

According to Embodiment 3, the dynamic mapping destination of the logical address is maintained in the log-structured space 602. Therefore, there is no need to change the dynamic mapping destination between the regions in the static mapping space 601. In other words, it is expected to be possible to alleviate the frequency of changing the dynamic mapping destination and to reduce the data copy illustrated in FIGS. 33 and 35.

Embodiment 4

Embodiment 4 will be described. At this time, the differences from Embodiments 1 and 3 will be mainly described, and the description of the common points with Embodiments 1 and 3 will be omitted or simplified.

In Embodiment 4, it is possible to skip parity generation in the backend write processing.

FIG. 29 illustrates a part of a flow of the deduplication processing according to Embodiment 4.

After S2108 or S2111, in S2901, the deduplication program 415 determines whether or not the duplication destination belongs to the RG 504 to which the duplication source belongs.

In a case where the determination result of S2901 is true (S2901: YES), in S2902, the deduplication program 415 sets the parity generation not to be necessary for the duplication destination (zero data). The fact that the zero data is written means that the duplication source data exists, and thus, when the duplication source data and the zero data are written to the same RG 504, the parity generation may not be necessary.

In a case where the parity generation is set not to be necessary, no parity is generated in S2304 of the backend write processing.

Meanwhile, in a case where the duplication source data is in an RG different from the write destination RG 504 of the zero data (that is, in a case where the physical address at which the duplication source data exists and the physical address at which the zero data is written belong to different RGs), the parity is generated.

FIG. 30 illustrates a flow of collection read processing.

In S3001, the read program 411 determines whether or not there is the duplication source data that corresponds to the collection target data (restoration target data).

In a case where the determination result in S3001 is true (S3001: YES), in S3002, the read program 411 stages the duplication source data that corresponds to the collection target data (reads out the duplication source data from the FMD 320 to the cache memory 402).

In S3003, the read program 411 executes the collection processing. Specifically, for example, in a case where S3002 is executed, the read program 411 sets the staged duplication source data as a collection target. In addition, in a case where S3002 is not executed, the read program 411 stages the collection target data and sets the data as a collection target.

In S3004, the read program 411 destages the data to be collected to the restoration destination FMD 320.

Above, several examples were described, but these are examples for describing the present invention, and the scope of the present invention is not limited to the examples. The present invention can also be implemented in various other forms.

For example, as a computer system, a server system including a processor unit and a storage unit may be adopted. In this case, the FMD may be prepared outside or inside the server system. The server system includes an interface unit to which the FMD is connected, a storage unit, and a processor unit connected to the interface unit and the storage unit. In the server system, the host system that serves as a transmission source of the write request may be an application executed by the server system or a virtual server.

REFERENCE SIGNS LIST

200: storage system

The invention claimed is:

1. A computer system comprising a storage medium, a storage device having a storage device controller unit, and a storage controller unit connected to the storage device,
    wherein the storage device controller unit of the storage device is configured to execute:
        a compression function for compressing data and storing the data in the storage medium;
        a capacity virtualization function that virtualizes storage capacity of the storage medium by compressing the data and provides a virtual address space in which an actual address in the storage medium is specified by a virtual address and which has a greater capacity than the storage medium; and
        an unmapping function of canceling a mapping of an actual address in the storage medium to a virtual address designated by an unmapping command,
    wherein the storage controller unit is configured to:
        execute a mapping function for managing a mapping between logical addresses that are provided to a host system and physical addresses corresponding to the virtual address space, wherein the mapping maps a first logical address to a first physical address and a second logical address to a second physical address; and,
        in response to second data at the second logical address being updated to become duplicative of first data at the first logical address, instead of storing both the first data and the second data on the storage device, change the mapping of one or both of the first logical address and the second logical address, so that the first logical address and the second logical address are both mapped to a single physical address, and transmit to the storage device an unmapping command that causes the storage device controller unit to cancel a mapping between an actual address in the storage medium and a virtual address corresponding to at least one of the first physical address and the second physical address.

2. The computer system according to claim 1, wherein the single physical address is a third physical address that is different from the first physical address and the second physical address, and wherein the unmapping command causes the storage device controller to cancel a mapping between an actual address in the storage medium and a virtual address corresponding to the second physical address.

3. The computer system according to claim 2, comprising a static mapping space and log-structured space, wherein the first and/or the second physical address belongs to the static mapping space, and the third physical address belongs to the log-structured space.

4. The computer system according to claim 1, wherein the single physical address is the second physical address, such that the first logical address and the second logical address are both mapped to the second physical address, and wherein the unmapping command causes the storage device controller unit to cancel a mapping between an actual address in the storage medium and a virtual address corresponding to the first physical address.

5. The computer system that includes a storage medium, a storage device having a storage device controller unit, and a storage controller unit connected to the storage device,
wherein the storage device controller unit of the storage device is configured to execute:
a compression function for compressing data and storing the data in the storage medium; and
a capacity virtualization function that virtualizes storage capacity of the storage medium by compressing the data and provides a virtualization address space in which storage capacity of the storage medium is virtualized and an actual address in the storage medium is specified by a virtual address and which has a greater capacity than the storage medium, and
wherein the storage controller unit is configured to:
execute a mapping function for managing a mapping between logical addresses that are provided to a host system and physical addresses corresponding to the virtual address space, wherein the mapping maps a first logical address to a first physical address and a second logical address to a second physical address; and,
in response to second data at the second logical address being updated to become duplicative of first data at the first logical address, instead of storing both the first data and the second data on the storage device, change the mapping of one of the first logical address and the second logical address, so that the first logical address and the second logical address are both mapped to a single physical address, and
transmit to the storage device a write command of predetermined data that causes the storage device controller unit to compress and store the predetermined data at an actual address in the storage medium that maps to a virtual address corresponding to at least one of the first physical address and the second physical address.

6. The computer system according to claim 5, wherein the predetermined data is data in which all bit values are the same.

7. A storage control method performed by a computer system that includes a storage medium, a storage device having a storage device controller unit, and a storage controller unit connected to the storage device,
wherein the storage device controller unit of the storage device executes:
a compression function for compressing data and storing the data in the storage medium;
a capacity virtualization function that virtualizes storage capacity of the storage medium by compressing the data and provides a virtualization address space in which an actual address in the storage medium is specified by a virtual address and which has a greater capacity than the storage medium; and
an unmapping function of canceling a mapping of an actual address in the storage medium to a virtual address designated by an unmapping command,
wherein the storage controller unit
executes a mapping function for managing a mapping between logical addresses that are provided to a host system and physical addresses corresponding to the virtual address space, wherein the mapping maps a first logical address to a first physical address and a second logical address to a second physical address, and,
in response to second data at the second logical address being updated to become duplicative of first data at the first logical address, instead of storing both the first data and the second data on the storage device, changes the mapping of one or both of the first logical address and the second logical address, so that the first logical address and the second logical address are both mapped to a single physical address, and
transmits to the storage device an unmapping command that causes the storage device controller unit to cancel a mapping between an actual address in the storage medium and a virtual address corresponding to at least one of the first physical address and the second physical address.

8. A storage control method performed by a computer system that includes a storage medium, a storage device having a storage device controller unit, and a storage controller unit connected to the storage device,
wherein the storage device controller of the storage device executes
a compression function for compressing data and storing the data in the storage medium; and
a capacity virtualization function that virtualizes storage capacity of the storage medium by compressing the data and provides a virtualization address space in which storage capacity of the storage medium is virtualized and an actual address in the storage medium is specified by a virtual address and which has a greater capacity than the storage medium, and
wherein the storage controller unit
executes a mapping function for managing a mapping between logical addresses that are provided to a host system and physical addresses corresponding to the virtual address space, wherein the mapping maps a first logical address to a first physical address and a second logical address to a second physical address, and,
in response to second data at the second logical address being updated to become duplicative of first data at the first logical address, instead of storing both the first data and the second data on the storage device, changes the mapping of one of the first logical address and the second logical address, so that the first logical address and the second logical address are both mapped to a single physical address, and
transmits to the storage device a write command of predetermined data that causes the storage device controller unit to compress and store the predetermined data at an actual address in the storage medium that maps to a virtual address corresponding to at least one of the first physical address and the second physical address.

9. The computer system according to claim 1, wherein the single physical address is the first physical address, such that the first logical address and the second logical address are both mapped to the first physical address, and wherein the unmapping command causes the storage device controller unit to cancel a mapping between an actual address in the storage medium and a virtual address corresponding to the second physical address.

10. The computer system according to claim 5, wherein the single physical address is the first physical address, such that the first logical address and the second logical address are both mapped to the first physical address, and wherein the write command causes the storage device controller unit to compress and store the predetermined data at an actual address in the storage medium that maps to a virtual address corresponding to the second physical address.

11. The computer system according to claim 1, wherein the logical addresses and the physical addresses are statically mapped, and wherein the storage controller unit is configured to:
- map first data, which made the first logical address a write destination, to the first physical address associated with the first logical address;
- map second data, which made the second logical address a write address, to the second physical address associated with the second logical address;
- when the first data and the second data are duplicative of each other, change the mapping of one or both of the first logical address and the second logical address so that the first logical address and the second logical address are mapped to a same physical address; and,
- when the first data and the second data are updated so as not to be duplicative of each other, change the mapping of one or both of the first logical address and the second logical address so that the first logical address of the updated first data is mapped to the first physical address, and the second logical address of the updated second data is mapped to the second physical address.

12. The computer system according to claim 5, wherein the logical addresses and the physical addresses are statically mapped, and wherein the storage controller unit is configured to:
- map first data, which made the first logical address a write destination, to the first physical address associated with the first logical address;
- map second data, which made the second logical address a write address, to the second physical address associated with the second logical address;
- when the first data and the second data are duplicative of each other, change the mapping of one or both of the first logical address and the second logical address so that the first logical address and the second logical address are mapped to a same physical address; and,
- when the first data and the second data are updated so as not to be duplicative of each other, change the mapping of one or both of the first logical address and the second logical address so that the first logical address of the updated first data is mapped to the first physical address, and the second logical address of the updated second data is mapped to the second physical address.

13. The storage control method according to claim 7, wherein the logical addresses and the physical addresses are statically mapped, and wherein the storage controller unit:
- maps first data, which made the first logical address a write destination, to the first physical address associated with the first logical address;
- maps second data, which made the second logical address a write address, to the second physical address associated with the second logical address;
- when the first data and the second data are duplicative of each other, changes the mapping of one or both of the first logical address and the second logical address so that the first logical address and the second logical address are mapped to a same physical address; and,
- when the first data and the second data are updated so as not to be duplicative of each other, changes the mapping of one or both of the first logical address and the second logical address so that the first logical address of the updated first data is mapped to the first physical address, and the second logical address of the updated second data is mapped to the second physical address.

14. The storage control method according to claim 7, wherein the logical addresses and the physical addresses are statically mapped, and wherein the storage controller unit:
- maps first data, which made the first logical address a write destination, to the first physical address associated with the first logical address;
- maps second data, which made the second logical address a write address, to the second physical address associated with the second logical address;
- when the first data and the second data are duplicative of each other, changes the mapping of one or both of the first logical address and the second logical address so that the first logical address and the second logical address are mapped to a same physical address; and,
- when the first data and the second data are updated so as not to be duplicative of each other, changes the mapping of one or both of the first logical address and the second logical address so that the first logical address of the updated first data is mapped to the first physical address, and the second logical address of the updated second data is mapped to the second physical address.

* * * * *